(12) United States Patent
Yamagishi et al.

(10) Patent No.: US 10,986,397 B2
(45) Date of Patent: Apr. 20, 2021

(54) RECEPTION APPARATUS, TRANSMISSION APPARATUS, AND DATA PROCESSING METHOD

(71) Applicant: Saturn Licensing LLC, New York, NY (US)

(72) Inventors: Yasuaki Yamagishi, Kanagawa (JP); Tatsuya Igarashi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/766,850

(22) PCT Filed: Nov. 11, 2016

(86) PCT No.: PCT/JP2016/083467
§ 371 (c)(1),
(2) Date: Apr. 9, 2018

(87) PCT Pub. No.: WO2017/090457
PCT Pub. Date: Jun. 1, 2017

(65) Prior Publication Data
US 2018/0288468 A1 Oct. 4, 2018

(30) Foreign Application Priority Data
Nov. 25, 2015 (JP) .............................. JP2015-229769

(51) Int. Cl.
*H04N 7/10* (2006.01)
*H04N 7/025* (2006.01)
(Continued)

(52) U.S. Cl.
CPC ........... *H04N 21/433* (2013.01); *G06F 13/00* (2013.01); *H04H 60/27* (2013.01);
(Continued)

(58) Field of Classification Search
CPC ............. H04N 21/433; H04N 21/2362; H04N 21/4331; H04N 21/434; H04N 21/4345;
(Continued)

(56) References Cited

U.S. PATENT DOCUMENTS

2002/0010939 A1   1/2002  Fujita et al.
2002/0174439 A1  11/2002  Akiyama et al.
(Continued)

FOREIGN PATENT DOCUMENTS

CN    104604243       11/2018
JP    2001-197381 A    7/2001
(Continued)

OTHER PUBLICATIONS

International Search Report dated Feb. 14, 2017 in PCT/JP2016/083467, 2 pages.
(Continued)

*Primary Examiner* — Kyu Chae
(74) *Attorney, Agent, or Firm* — Oblon, McClelland, Maier & Neustadt, L.L.P.

(57) ABSTRACT

The present technology relates to a reception apparatus, a transmission apparatus, and a data processing method that permit sharing of a resource that is reused among a plurality of services.
The reception apparatus receives content and controls, on the basis of control information that is transported together with the content and that includes resource sharing information indicating whether a resource of the content is shared among a plurality of services, storage of the resource in a storage apparatus such that the resource is shared among the plurality of services. The present technology is applicable, for example, to a television receiver that supports ATSC 3.0.

20 Claims, 31 Drawing Sheets

(51) Int. Cl.
    *H04N 21/433*     (2011.01)
    *H04H 60/27*     (2008.01)
    *H04N 21/2362*     (2011.01)
    *G06F 13/00*     (2006.01)
    *H04N 21/81*     (2011.01)
    *H04N 21/61*     (2011.01)
    *H04N 21/434*     (2011.01)
    *H04N 21/845*     (2011.01)
    *H04N 21/6543*     (2011.01)

(52) U.S. Cl.
    CPC ....... *H04N 21/2362* (2013.01); *H04N 21/434* (2013.01); *H04N 21/4331* (2013.01); *H04N 21/4345* (2013.01); *H04N 21/6112* (2013.01); *H04N 21/6125* (2013.01); *H04N 21/6543* (2013.01); *H04N 21/8173* (2013.01); *H04N 21/8456* (2013.01)

(58) Field of Classification Search
    CPC ........... H04N 21/6112; H04N 21/6125; H04N 21/6543; H04N 21/8173; H04N 21/8456; G06F 13/00; H04H 60/27
    See application file for complete search history.

(56) References Cited

U.S. PATENT DOCUMENTS

| | | | |
|---|---|---|---|
| 2006/0200562 A1* | 9/2006 | de Bonet | G06F 9/541 |
| | | | 709/226 |
| 2007/0192820 A1 | 8/2007 | Watanabe et al. | |
| 2008/0098420 A1* | 4/2008 | Khivesara | G06Q 30/02 |
| | | | 725/32 |
| 2008/0222694 A1* | 9/2008 | Nakae | H04L 63/20 |
| | | | 726/1 |
| 2011/0167486 A1 | 7/2011 | Ayloo et al. | |
| 2015/0312288 A1* | 10/2015 | Icho | H04L 63/08 |
| | | | 709/204 |
| 2016/0044049 A1* | 2/2016 | Xing | H04W 12/1208 |
| | | | 726/23 |
| 2018/0338185 A1* | 11/2018 | Kitazato | H04N 21/64322 |

FOREIGN PATENT DOCUMENTS

| | | |
|---|---|---|
| JP | 2002-101056 A | 4/2002 |
| JP | 2003-32653 A | 1/2003 |
| JP | 2006-99698 A | 4/2006 |
| JP | 2008-17207 A | 1/2008 |
| JP | 2014057227 | 3/2014 |

OTHER PUBLICATIONS

Extended European Search Report dated Dec. 7. 2018 in corresponding European Patent Application No. 16868405.8, 12 pages.
ETSI, "Digital Video Broadcasting (DVB); Signalling and carriage of interactive applications and Services in Hybrid broadcast/broadband environments, Technical Specification", XP 55132824, Jul. 1, 2013, pp. 1-98.
Supplementary Partial European Search Report dated Oct. 1, 2018 in European Patent Application No. 16868405.8 11 pages.

* cited by examiner

F I G . 1 1

```
MPD
  Period A1 (Ad Break #1):
    @xlink:href=http://adservice.com/adp-1?user=$groupID$
    @xlink:actuate="onRequest"
    @start=0
    @duration=60sec
    ...
  Period M1 (Main Program identified by Assetidentifier):
    @duration=15min
    ...
  Period A2 (Ad Break #2):
    @xlink:href=http://adservice.com/adp-1?user=$groupID$
    @xlink:actuate="onRequest"
    @start=16min
    @duration=60sec
    ...
  Period M2 (Main Program identified by Assetidentifier):
    @duration=15min
    ...
  Period A3 (Ad Break #3):
    @xlink:href=http://adservice.com/adp-1?user=$groupID$
    @xlink:actuate="onRequest"
    @start=32min
    @duration=60sec
    ...
  Period M3 (Main Program identified by Assetidentifier):
    @duration=27min
    ...
```

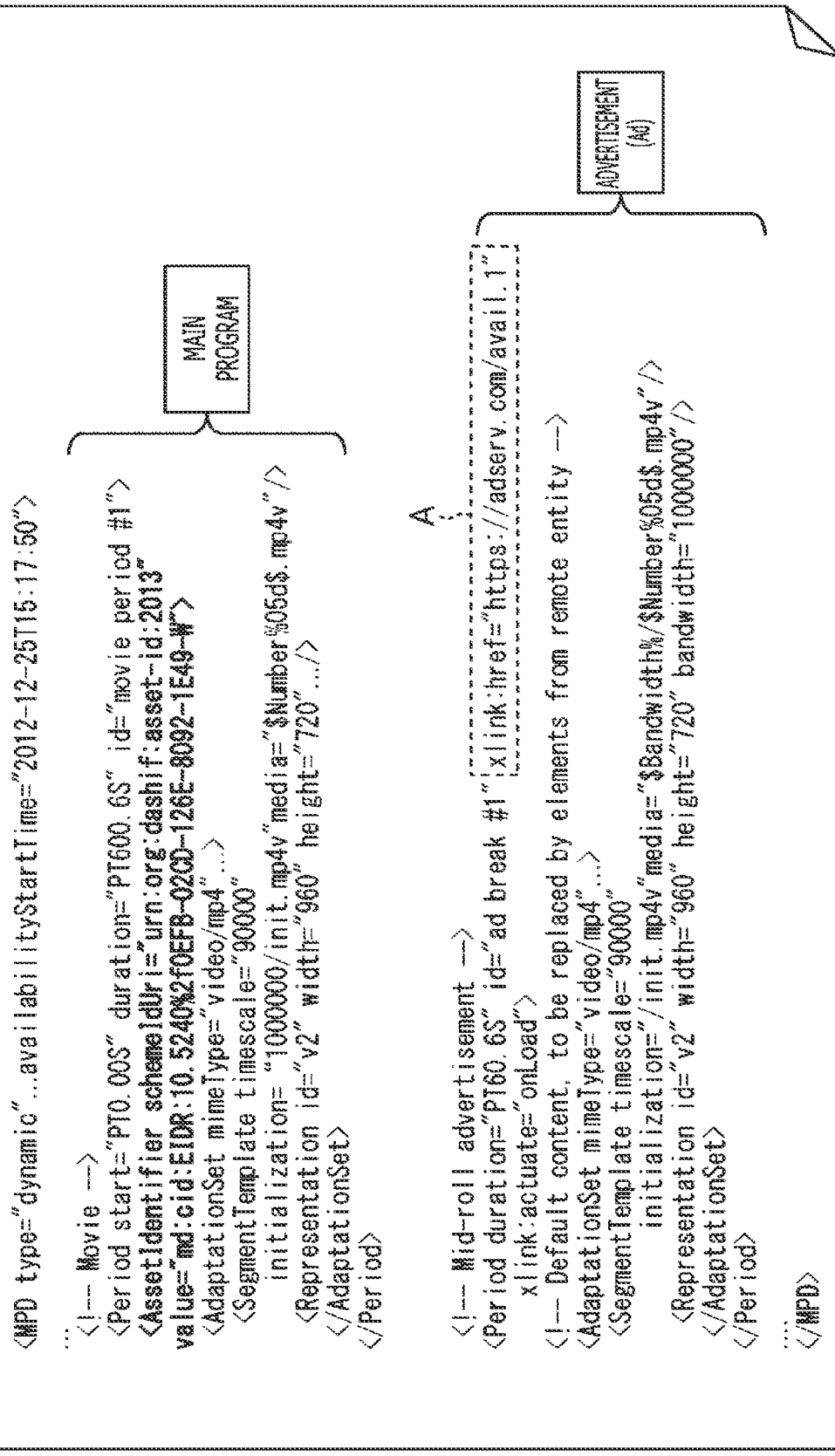

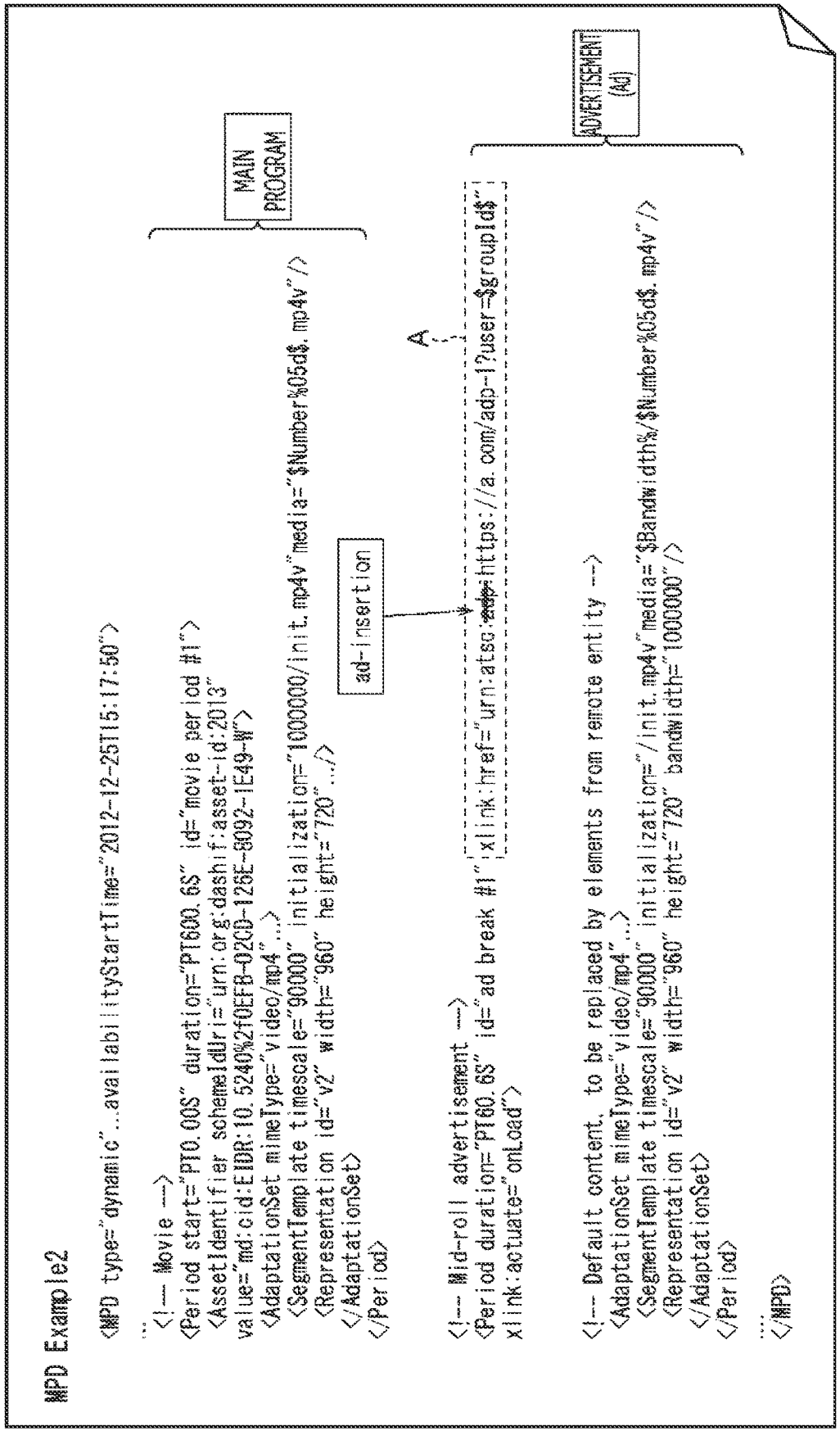

FIG. 15

| Element or Attribute Name | Use | DataType | Short Description |
|---|---|---|---|
| SLT | | | Root element of the SLT |
| @bsid | 1 | unsignedShort | Identifier of the entire Broadcast Stream. |
| @sltCapabilities | 0..1 | string | Required capabilities for decoding and meaningfully presenting the content for all the services in this SLT instance. |
| sltInetUrl | 0..1 | anyURI | Base URL to acquire ESG or service level signalling files available via broadband for services in this SLT. |
|   @urlType | 0..1 | unsignedByte | Type of files available with this URL |
| Service | 1..N | | Service information |
|   @serviceId | 1 | unsignedShort | Integer number that identifies this Service within the scope of this Broadcast area. |
|   @sltSvcSeqNum | 1 | unsignedByte | Version of SLT service info for this service. |
|   @protected | 0..1 | boolean | Indicates whether one or more components needed for meaningful presentation of this service are protected. |
|   @majorChannelNo | 0..1 | 1..999 | Major channel number of the service |
|   @minorChannelNo | 0..1 | 1..999 | Minor channel number of the service |
|   @serviceCategory | 1 | unsignedByte | Service category, coded per Table 2.3 |
|   @shortServiceName | 0..1 | string | Short name of the Service |
|   @hidden | 0..1 | boolean | Indicates whether the service is intended for testing or proprietary use, and is not to be selected by ordinary TV receivers. |
|   @broadbandAccessRequired | 0..1 | boolean | Indicates whether broadband access is required for a receiver to make a meaningful presentation of the service. |
|   @svcCapabilities | 0..1 | string | Required capabilities for decoding and meaningfully presenting content of this service. |
|   @quotaDomain | 0..1 | string | QuotaDomain indicates cache quota sharing domain for services. Services which have the same QuotaDomain shares the cache. |
|   BroadcastSvcSignaling | 0..1 | | Location, protocol, address, id information for broadcast signalling |
|     @slsProtocol | 1 | unsignedByte | Protocol used to deliver the service layer signalling for this service |
|     @slsMajorProtocolVersion | 1 | unsignedByte | Major version number of protocol used to deliver Service Layer Signalling for this service. |
|     @slsMinorProtocolVersion | 1 | unsignedByte | Minor version number of protocol used to deliver Service Layer Signalling for this service. |
|     @slsPlpId | 1 | unsignedByte | PLP ID of the physical layer pipe carrying the broadcast SLS for this service. |
|     @slsDestinationIpAddress | 1 | string | A string containing the dotted-IPv4 destination address of the packets carrying broadcast SLS data for this service. |
|     @slsDestinationUdpPort | 1 | unsignedShort | Port number of the packets carrying broadcast SLS data for this service. |
|     @slsSourceIpAddress | 1 | string | A string containing the dotted-IPv4 source address of the packets carrying broadcast SLS data for this service. |
|   svcInetUrl | 0..N | anyURI | URL to access Internet signalling for this service |
|     @urlType | 0..1 | unsignedByte | Type of files available with this URL |

FIG. 16-1

FIG. 16
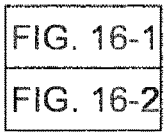

| Element or Attribute Name | Use | DataType | Description |
|---|---|---|---|
| bundleDescription | | | Root element of the User Service Bundle Description. |
|   userServiceDescription | | | A single instance of an ATSC 3.0 Service. |
|     @globalServiceID | 1 | anyURL | A globally unique URI that identifies the ATSC 3.0 Service, unique within the scope of the BSID. This parameter is used to link to ESG data (Service@globalServiceID). |
|     @serciveId | 1 | unsignedShort | Reference to corresponding service entry in LLS (SLT). The value of this attribute is the same value of serviceId assigned to the entry. |
|     @serviceStatus | 0..1 | boolean | Specify the status of this service. The value indicates whether this service is active or inactive. When set to "1" (true), that indicates service is active. Shall default to 1 when not present. |
|     @fullMPDUri | 1 | anyURL | Reference to an MPD fragment which contains descriptions for contents components of the ATSC 3.0 Service delivered over broadcast and optionally, also broadband. |
|     @sTSIDUri | 1 | anyURL | Reference to an S-TSID fragment which provides access related parameters to the Transport sessions carrying contents of this ATSC 3.0 Service. |
|     @quotaDomain | 0..1 | string | QuotaDomain indicates cache quota sharing domain for services. Services which share the same QuotaDomain shares the same cache. |
|     name | 0..N | string | Name of the ATSC 3.0 service as given by the lang attribute |
|       @lang | 1 | language | Language of the ATSC 3.0 service name. The language shall be specified according to BCP 47 |
|     serviceLanguage | 0..N | language | Available languages of the ATSC 3.0 service. The language shall be specified according to BCP 47 |

FIG. 16-2

FIG. 16
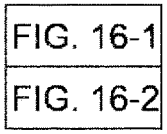

| capabilityCode | 0..1 | string | Specifies the capabilities and capability groups, as defined in the ATSC 3.0 Service Announcement specification, required in the receiver to be able to create a meaningful presentation of the content of this ATSC service. The format of this element shall be identical to the capabilities element specified under the Content fragment of the ATSC 3.0 Service Announcement specificaiton |
|---|---|---|---|
| deliveryMethod | 1..N | | Container of transport related information pertaining to the contents of the service over broadcast and (optionally) broadband modes of access. |
|   broadcastAppService | 1..N | | A DASH Representation delivered over broadcast, in multiplexed or non-multiplexed form, containing the corresponding media component (s) belonging to the ATSC 3.0 Service, across all Periods of the affilialed Media Presentation. |
|     basePattern | 1..N | string | A character pattern for use by the ATSC receiver to match against any portion of the Segment URL used by the DASH client to request Media Segments of a parent Representation under ist containing Period. A match implies that the corresponding requested Media Segment is carried over broadcast transport. |
|   unicastAppService | 0..N | | A DASH Representation delivered over broadband, in multiplexed or non-multiplexed form, containing the constituent media content component (s) belonging to the ATSC 3.0 Service, across all Periods of the affiliated Media Presentation. |
|     basePattern | 1..N | string | A character pattern for use by the ATSC receiver to match against any portion of the Segment URL used by the DASH client to request Media Segments of a parent Representation under ist containing Period. A match implies that the corresponding requested Media Segment is carried over broadband transport. |

FIG.17

| Element and Attribute Names | | | | | | | Use | DataType | Description |
|---|---|---|---|---|---|---|---|---|---|
| S-TSID | | | | | | | | | Service Transport Session Instance Description |
| | @serviceId | | | | | | 0..1 | unsignedShort | Reference to corresponding service element in the USD. The value of this attribute shall reference a service with a corresponding value of ServiceId. |
| | RS | | | | | | 1..N | | ROUTE session |
| | | @bsid | | | | | 0..1 | unsignedShort | Identifier of the Broadcast Stream within which the content component(s) of the broadcastAppService are carried. When this attribute is absent, the default Broadcast Stream is the one whose PLPs carry SLS fragments for this ATSC 3.0 service. Its value shall be identical to that of the @bsid in the SLT. |
| | | @sIpAddr | | | | | 0..1 | string | Source IP address (default: current ROUTE session's source IP address) (M for non-primary session) |
| | | @dIpAddr | | | | | 0..1 | string | Destination IP address (default: current ROUTE session's destination IP address) (M for non-primary session) |
| | | @dport | | | | | 0..1 | unsignedShort | Destination port (default: current ROUTE session's destination port) (M for non-primary session) |
| | | @PLPID | | | | | 0..1 | unsignedByte | Physical Layer Pipe ID for ROUTE session (default: current physical layer pipe). PLP_ID shall be as specified A/322 "ATSC 3.0 Physical Layer Downlink Standard" |
| | | LS | | | | | 1..N | | LCT Session |
| | | | @tsi | | | | 1 | unsignedInt | TSI value |
| | | | @PLPID | | | | 0..1 | unsignedByte | PLP ID (overrides default ROUTE session value) |
| | | | @bw | | | | 0..1 | unsignedInt | Maximum bandwidth |
| | | | @startTime | | | | 0..1 | dateTime | Start time |
| | | | @endTime | | | | 0..1 | dateTime | End time |
| | | | SrcFlow | | | | 0..1 | | Source Flow as defined in , Section A.1 |
| | | | RprFlow | | | | 0..1 | | Repair Flow as defined in , Section |

FIG.18

| Element or Attribute Name | Use | DataType | Description |
|---|---|---|---|
| SrcFlow | | | Source flow carried in the LCT session. |
|   @rt | 0..1 | boolean | If @rt is not present, it is assumed false. Shall be present and set to "true" when the SrcFlow carries streaming media.<br><br>Default value: false |
|   @minBuffSize | 0..1 | unsignedInt | Defines the minimum number of kilobytes required in the receiver transport buffer for the LCT session. This value may be present if @rt is set to true. |
|   EFDT | 0..1 | | The extended FDT instance. See further description in Section |
|   ContentInfo | 0..1 | | May provide additional information that can be mapped to the application service that is carried in this transport session, e.g. Representation ID of a DASH content or the Adaptation Set parameters of a DASH Media Representation in order to select the LCT transport session for rendering. |
|     @quotaDomain | 0..1 | string | QuotaDomain indicates cache quota sharing domain for services. Services which have the same QuotaDomain shares the cache. |
|   Payload | 1..N | | Information on the payload of ROUTE packets carrying the objects of the source flow |
|     @codePoint | 0..1 | unsignedByte | A numerical representation of the combination of values specified for the child elements and attributes of the Payload element. The value of @codePoint shall be identical to the CP (Codepoint) field in the LCT header.<br><br>Default value = "0" |
|     @formatID | 1 | unsignedByte | Specifies the payload format of the delivery object. For details see |
|     @frag | 0..1 | unsignedByte | |
|     @order | 0..1 | unsignedByte | |
|     @srcFecPayloadID | 0..1 | unsignedByte | |
|     FECParams | 0..1 | | |

FIG. 19

| Element Name | Cardinality | DataType | Description |
|---|---|---|---|
| ApplicationList | 1 | mhp:ApplicationList | Includes a list of Application elements. |
| Application | 0..N | mhp:Application | Contains properties of an application. |
| appName | 1..N | ipi:MultilingualType | Name of the application |
| @language | R | dvb:ISO639-2 | |
| applicationIdentifier | 1 | mhp:ApplicationIdentifier | Identifies the application. |
| orgId | 1 | unsignedInt | |
| appId | 1 | unsignedShort | |
| applicationDescriptor | 1 | mhp:ApplicationDescriptor | Contains general properties of the application. |
| type | 1 | mhp:ApplicationType | |
| <choice> | | | |
| DvbApp | | mhp:DvbApplicationType | |
| OtherApp | | mpeg7:mimeType | |
| atsc:AtscApp | | string | |
| controlCode | 1 | mhp:ApplicationControlCode | |
| visibility | 0..1 | mhp:VisibilityDescriptor | |
| serviceBound | 0..1 | boolean | |
| priority | 1 | ipi:Hexadecimal8bit | |
| version | 1 | ipi:Version (patterned string) | |
| icon | 0..1 | mhp:IconDescriptor | |
| | | ptor | |
| storageCapabilities | 0..1 | mhp:StorageCapabilities | |
| storageProperty | 0..1 | mhp:StorageType | |
| @launchableFromBroadcast | R | boolean | |
| @launchableCompletelyFromCache | R | boolean | |
| @launchableWithOlderVersion | R | boolean | |

| Element Name | Cardinality | DataType | Description |
|---|---|---|---|
| applicationUsageDescriptor | 0..1 | mhp:ApplicationUsageDescriptor | |
| ApplicationUsage | 0..N | anyURI | |
| applicationBoundary | 0..1 | mhp:SimpleApplicationBoundaryDescriptionType | Includes a set of boundaries of the application. |
| applicationTransport | 0..N | TransportProtocolDescriptionType | Identifies the transport protocol associated with a service component and possibly provides protocol dependent information. |
| <case of HTTPTransportType> | | | |
| URLBase | 1 | anyURI | |
| URLExtension | 0..N | anyURI | |
| <case of ROUTETransportType> | | | |
| atsc: ROUTESessionInfo | 1..N | | |
| LCTSession | 1..N | | |
| @ tsi | 1 | string | |
| @ plpID | OD | unsignedByte | |
| @ broadcastStreamId | OD | unsignedShort | |
| @ plpID | OD | unsignedByte | |
| @ sourceIpAddress | OD | string | |
| @ destinationIpAddress | OD | string | |
| @ destinationPort | OD | unsignedShort | |

| FIG. 20-1 |
| --- |
| FIG. 20-2 |

| | | | | |
|---|---|---|---|---|
| applicationLocation | | 1 | mhp: SimpleApplicatoinLocationDescriptorType | The URL path component to the entry point document of the application. |
| applicationSpecificDescriptor | | 0..1 | mhp: ApplicationSpecificDescriptor | includes the specific descriptor depending upon the type of application. It may include externally defined descriptors. |
| | <choice> | | | |
| | dvbDescriptor | | mhp: DVBJDescriptor | |
| | htmlDescriptor | | mhp: DVBHtmlDescriptor | |
| | otherDescriptor | | mhp: OtherDescriptor | |
| | atsc: atscDescriptor | | | |
| | @quotaDomain | 0..1 | string | QuotaDomain indicates cache quota sharing domain for services.<br>Services which have the same QuotaDomain shares the chache. |
| | size | 0..1 | unsignedLong | |
| | requiredCapabilities | 0..1 | string | |
| | icon | 0..N | | |
| | @ filename | R | string | |
| | @ size | O | string | |
| | @ aspectRatio | O | string | |

| Element Name | | | | Cardinality | DataType | Description |
|---|---|---|---|---|---|---|
| ApplicationRecordingDescriptor | | | | 0...1 | | |
| | scheduled_recording_flag | | | 0...1 | boolean | |
| | trick_mode_aware_flag | | | 0...1 | boolean | |
| | time_shift_flag | | | 0...1 | boolean | |
| | dynamic_flag | | | 0...1 | boolean | |
| | av_synced_flag | | | 0...1 | boolean | |
| | initiating_replay_flag | | | 0...1 | boolean | |
| | storage_properties | | | 0...1 | unsignedByte | |
| timeSlotInfo | | | | | | |
| | timeslot_type | | | 1 | unsignedByte | |
| | timeslot_start | | | 1 | dateTime | |
| | timeslot_length | | | 1 | unsignedShort | |
| | acquisition_time | | | 1 | unsignedShort | |
| | repeat_period | | | 1 | unsignedShort | |
| contentLinkage | | | | 0...1 | unsignedInt | |
| contentItem | | | | 0...N | | |
| | @ location | | | 0...1 | anyURI | |
| | @ contentLinkage | | | 0...1 | unsignedInt | |
| | @ updatesAvailable | | | 0...1 | boolean | |
| | @ size | | | 0...1 | unsignedLong | |
| | timeSlotInfo | | | 0...1 | | |
| | | timeslot_type | | 1 | unsignedByte | |
| | | timeslot_start | | 1 | dateTime | |
| | | timeslot_length | | 1 | unsignedShort | |
| | | acquisition_time | | 1 | unsignedShort | |
| | | repeat_period | | 1 | unsignedShort | |
| graphicConstraintsDescriptor | | | | 0...1 | | |
| | can_run_without_visible_ui | | | 0...1 | boolean | |
| | handles_configuration_changed | | | 0...1 | boolean | |
| | handles_externally_controlled_video | | | 0...1 | boolean | |
| | graphics_configuration_byte | | | 0...1 | unsignedByte | |
| | screenPosition | | | 0...1 | string | |
| ApplicationReference | | | | 0...1 | mhp:ApplicationIdentifier | |

RECEPTION APPARATUS, TRANSMISSION APPARATUS, AND DATA PROCESSING METHOD

TECHNICAL FIELD

The present technology relates to a reception apparatus, a transmission apparatus, and a data processing method, and more particularly, to a reception apparatus, a transmission apparatus, and a data processing method that permit sharing of a resource that is reused among a plurality of services.

BACKGROUND ART

In order to improve performance of access to files of an application accompanying a specific service in a client apparatus, it is necessary to cache necessary files in a local cache in advance.

ATSC (Advanced Television Systems Committee) 3.0, the United States' next generation of broadcasting standard currently under development, for example, assumes a model in which all files acquired via broadcasting or communication are temporarily accumulated in a local cache on a local file system in a client apparatus and provided to a stream renderer and an application. It should be noted, however, that a file system such as On Memory or SSD (Solid State Drive) or a special database is used as a local file system, for example.

These files in the local cache will be kept in the cache for a limited time period first and then deleted on the basis of parameters of cache control headers of HTTP (Hypertext Transfer Protocol) headers that accompany the files. It should be noted that such a process takes place where entity mode, a kind of ROUTE (Real-time Object Delivery over Unidirectional Transport) protocol delivery mode, is selected.

In general, all files in receivable broadcast waves cannot be cached due to tuner and storage resource limitations of a client apparatus. Therefore, a type of operation is assumed in which only a group of files required for a tuned service at that point are acquired and cached and, in a case where the service (channel) is switched over to other service, the storage resource is released immediately.

It should be noted that efforts are being made at a brisk pace to develop and standardize technologies for delivering content such as broadcast programs and advertisements from a broadcast server of a broadcasting station via unidirectional broadcasting or from a communication server via bidirectional communication to a client apparatus. As such a technology for realizing data delivery via broadcasting or communication, the technology disclosed, for example, in PTL 1 is known.

CITATION LIST

Patent Literature

[PTL 1]
JP 2014-57227A

SUMMARY

Technical Problem

Here, effective use of cash storage area, delivery band, and so on can be achieved by sharing, for example, advertisement content files, files commonly used in any service, of those files transported in a service. For this reason, proposals have been requested for sharing of resources that are reused among a plurality of services.

The present technology has been devised in light of the above circumstances, and it is an object of the present technology to permit sharing of a resource that is reused among a plurality of services.

Solution to Problem

A reception apparatus of a first aspect of the present technology is a reception apparatus that includes a reception section and a control section. The reception section receives content. The control section controls, on the basis of control information that is transported together with the content and that includes resource sharing information indicating whether a resource of the content is shared among a plurality of services, storage of the resource in a storage apparatus such that the resource is shared among the plurality of services.

The reception apparatus of the first aspect of the present technology may be a separate apparatus or an internal block making up an apparatus. Also, a data processing method of the first aspect of the present technology is a data processing method associated with the reception apparatus of the first aspect of the present technology described above.

In the reception apparatus and the data processing method of the first aspect of the present technology, content is received, and storage of the resource in a storage apparatus is controlled on the basis of control information that is transported together with the content and that includes resource sharing information indicating whether a resource of the content is shared among a plurality of services such that the resource is shared among the plurality of services.

A transmission apparatus of a second aspect of the present technology is a transmission apparatus that includes a generation section and a transmission section. The generation section generates control information that includes resource sharing information indicating whether a resource of content is shared among a plurality of services. The transmission section sends the control information together with the content.

The transmission apparatus of the second aspect of the present technology may be a separate apparatus or an internal block making up an apparatus. Also, a data processing method of the second aspect of the present technology is a data processing method associated with the transmission apparatus of the second aspect of the present technology described above.

In the transmission apparatus and the data processing method of the second aspect of the present technology, control information is generated that includes resource sharing information indicating whether a resource of content is shared among a plurality of services, and the control information is sent together with the content.

Advantageous Effect of Invention

According to the first and second aspects of the present technology, a resource that is reused by a plurality of services can be shared.

It should be noted that the effect described herein is not necessarily limited and may be any one of the effects described in the present disclosure.

BRIEF DESCRIPTION OF DRAWINGS

FIG. 11 is a diagram illustrating a description example of an xlink:href attribute of a Period element of MPD metadata.

FIG. 13 is a diagram illustrating a description example of MPD metadata.

FIG. 14 is a diagram illustrating a description example of MPD metadata.

FIG. 15 is a diagram illustrating an example of an SLT format.

FIG. 16 is a diagram illustrating an example of a USBD format.

FIG. 17 is a diagram illustrating an example of an S-TSID format.

FIG. 18 is a diagram illustrating an example of an SrcFlow format.

FIG. 19 is a diagram illustrating an example of an AST format.

FIG. 20 is a diagram illustrating an example of the AST format.

FIG. 21 is a diagram illustrating an example of the AST format.

DESCRIPTION OF EMBODIMENTS

A description will be given below of embodiments of the present technology with reference to diagrams. It should be noted that a description will be given in the following order.
1. System Configuration
2. Overview of Cache Quota Domain
3. Application Example of Application
4. Examples of Signaling
5. Configuration of Each Apparatus
6. Flow of Processes Performed by Each Apparatus
7. Modification Example
8. Configuration of Computer <1. System Configuration>

(Configuration of Transport System)

Figure 1:
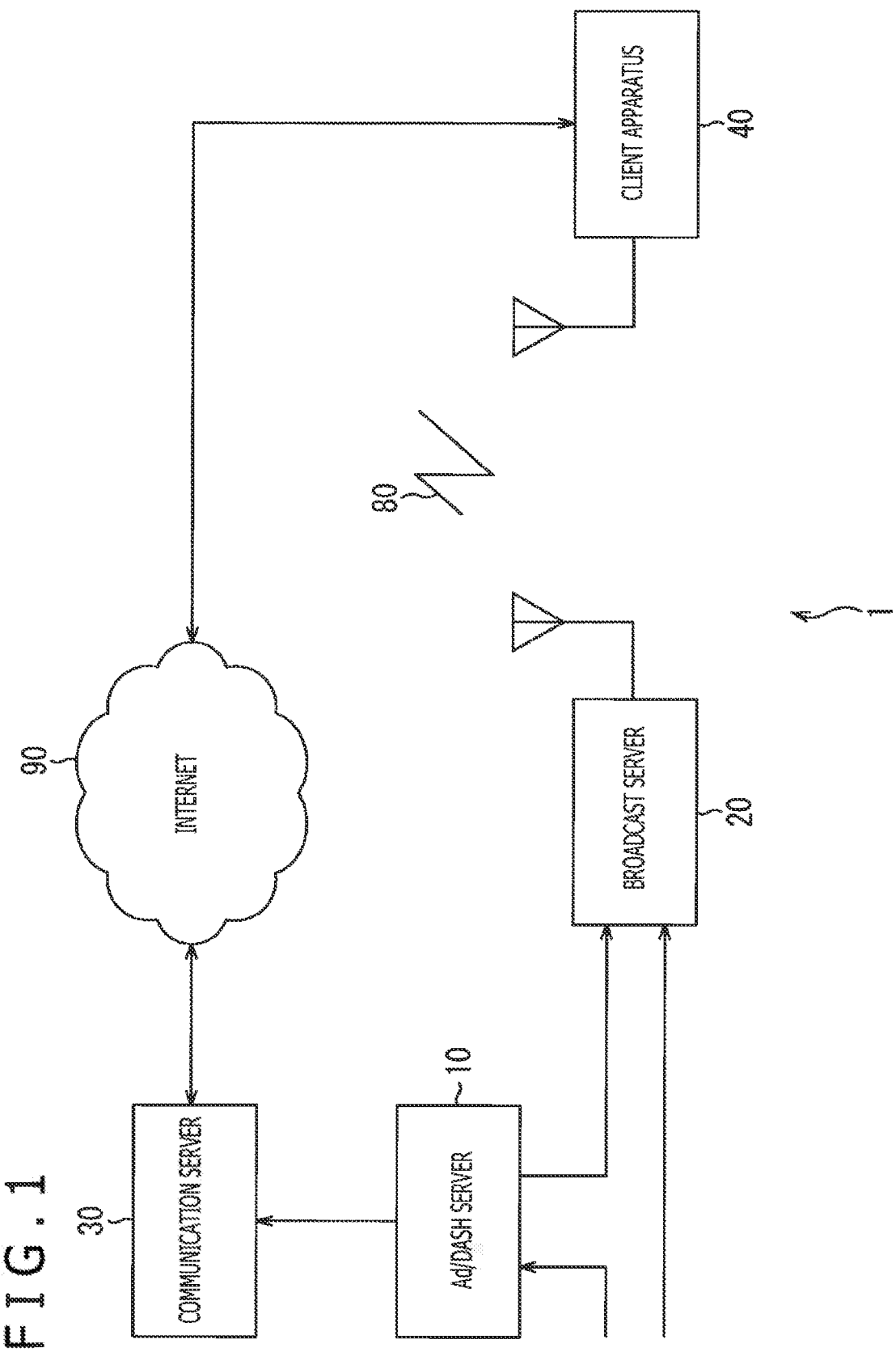
FIG. 1 is a diagram illustrating a configuration of an embodiment of a transport system to which the present technology is applied.

FIG. 1 is a diagram illustrating a configuration of an embodiment of a transport system to which the present technology is applied. It should be noted that a system refers to a logical set of a plurality of apparatuses.

In FIG. 1, a transport system 1 includes an Ad/DASH server 10, a broadcast server 20, a communication server 30, and a client apparatus 40.

The Ad/DASH server 10 is a server for handling delivery service that supports MPEG-DASH (Dynamic Adaptive Streaming over HTTP). Here, MPEG-DASH is a streaming delivery standard compliant with OTT-V (Over The Top Video) that relates to adaptive streaming delivery using HTTP (Hypertext Transfer Protocol)-based streaming protocol.

In this MPEG-DASH standard, a manifest file for describing metadata, management information of video and audio files and a file format for transporting video content are specified. It should be noted that a manifest file, the former, is referred to as MPD (Media Presentation Description). Also, a file format, the latter, is also referred to as a segment format.

The Ad/DASH server 10 generates files of a program content segment (hereinafter also referred to as a DASH segment) and an advertisement content segment (hereinafter also referred to as an Ad segment) and sends the files to the broadcast server 20 or the communication server 30. Also, the Ad/DASH server 10 generates MPD metadata and sends it to the broadcast server 20 or the communication server 30.

Also, the Ad/DASH server 10 generates an application and sends it to the broadcast server 20 or the communication server 30. As this application, for example, a scrip application that can execute a script is included. It should be noted that applications developed using a markup language such as HTML5 (HyperText Markup Language 5) and those developed using a script language such as JavaScript (registered trademark) can be used as script applications.

The broadcast server 20 is a transmitter capable of data transport compliant with a digital broadcasting standard such as ATSC 3.0. The broadcast server 20 processes DASH segments, Ad segments, MPD metadata, and application files sent from the Ad/DASH server 10 and sends (broadcasts) them together with signaling via a transport channel 80.

Also, NRT content is input to the broadcast server 20. NRT content is content transported by NRT (Non Real Time) broadcasting and reproduced after being stored temporarily in a storage of the client apparatus 40. The broadcast server 20 processes an NRT content file input thereto and sends (broadcasts) them via the transport channel 80.

The communication server 30 is a server that provides various pieces of data via the Internet 90 in response to a request from the client apparatus 40 connected to the Internet 90. The communication server 30 processes DASH segments, Ad segments, MPD metadata, and application files sent from the Ad/DASH server 10. Then, the communication server 30 sends various files via the Internet 90 in response to a request from the client apparatus 40.

The client apparatus 40 is a receiver capable of receiving transported data compliant with a digital broadcasting standard such as ATSC 3.0. For example, the client apparatus 40 is a stationary receiver such as television receiver or set top box or a mobile receiver such as smartphone, mobile phone, or tablet computer. The client apparatus 40 may be, for example, a piece of equipment mounted to an automobile such as vehicle-mounted television.

The client apparatus 40 outputs images and sounds of content such as broadcast programs and advertisements by receiving and processing files such as DASH segments, Ad segments, signaling, MPD metadata, applications, and NRT content sent (broadcast) from the broadcast server 20 via the transport channel 80.

Also, in a case where equipped with a communication capability, the client apparatus 40 can acquire various files by accessing the communication server 30 via the Internet 90. For example, the client apparatus 40 outputs images and sounds of content such as VOD (Video On Demand) programs and advertisements by receiving and processing files such as DASH segments, Ad segments, and MPD metadata sent (adaptively delivered by streaming) from the communication server 30 via the Internet 90.

It should be noted that, in the transport system 1, the transport channel 80 may be not only terrestrial wave (terrestrial wave broadcasting) but also satellite broadcasting using a broadcasting satellite (BS) or communications satellite (CS) or wired broadcasting using cables (CATV).

Also, ATSC 3.0 is a next-generation broadcasting standard in United States whose development is currently underway. ATSC 3.0 assumes that more advanced services will be provided by introducing, as a transport scheme, a scheme using IP (Internet Protocol) packet, used in the field of communication, for digital broadcasting (IP transport scheme) rather than MPEG2-TS (Transport Stream) scheme that is currently widespread.

(Protocol Stack of Present Technology)

Figure 2:
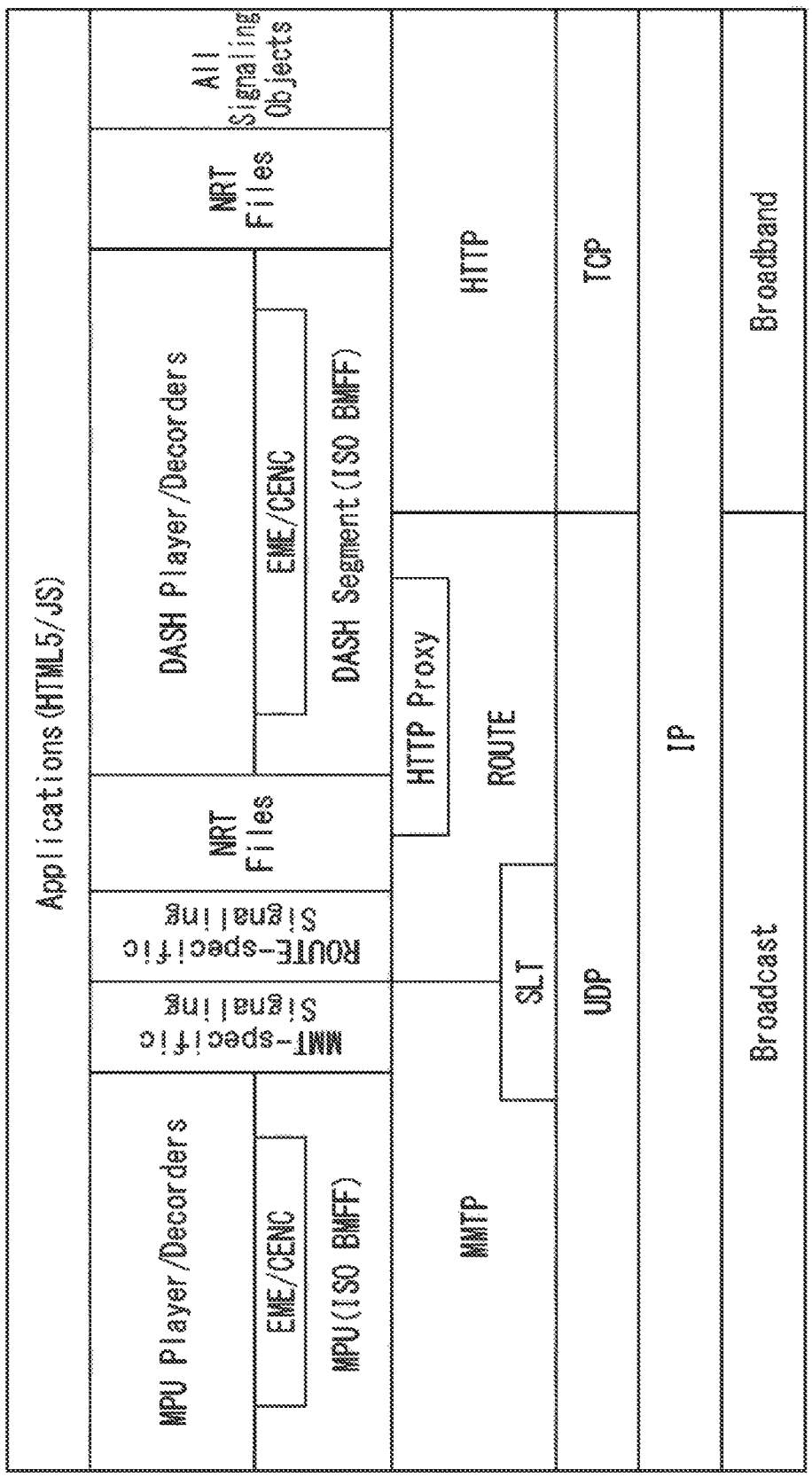
FIG. 2 is a diagram illustrating an example of a protocol stack of an IP transport scheme of the present technology.

FIG. 2 is a diagram illustrating an example of a protocol stack of the IP transport scheme of the present technology.

In FIG. 2, the lowermost layer is a physical layer. Digital broadcasting in IP transport scheme such as ATSC 3.0 not only handles transport using unidirectional broadcasting but also transports some data by means of bidirectional communication. In a case where broadcasting is used, the physical layer thereof (broadcast) is associated with a broadcasting wave's frequency band assigned for services (channels).

A layer above the physical layer (broadcast) is an IP layer. The IP layer corresponds to a network layer in a hierarchical communication model. An IP packet is identified by an IP address. An upper layer adjacent to the IP layer is a UDP (User Datagram Protocol) layer that corresponds to a transport layer in the hierarchical communication model, and the layer further thereabove is ROUTE (Real-time Object Delivery over Unidirectional Transport) or MMTP (MPEG Media Transport Protocol).

Also, the layer above the UDP layer, i.e., an IP packet including a UDP packet, is transported with SLT metadata contained therein. SLS metadata is LLS (Link Layer Signaling) signaling that includes basic information indicating a stream or service configuration in a broadcast network such as information required for tuning to a service (tuning information). It should be noted that LLS signaling is signaling acquired ahead of SLS (Service Layer Signaling) signaling, and SLS signaling is acquired in accordance with information included in LLS signaling.

ROUTE, a protocol for streaming file transfer, is an extended protocol of FLUTE (File Delivery over Unidirectional Transport). It should be noted that detailed content of ROUTE will be described later with reference to FIGS. 3 and 4.

Part of the upper layer adjacent to ROUTE is signaling (ROUTE specific Signaling) and NRT content (NRT Files). This signaling is SLS signaling and includes metadata such as USBD (User Service Bundle Description), S-TSID (Service-based Transport Session Instance Description), MPD (Media Presentation Description), AST (Application Signaling Table), and so on.

USD metadata includes information such as other metadata acquisition destination. S-TSID metadata, an extension of LSID (LCT Session Instance Description) for ATSC 3.0, is control information of the ROUTE protocol. MPD metadata is management information of video and audio files delivered by streaming as described earlier. AST is application control information.

It should be noted that NRT content is an example of content transported over a ROUTE session, and content such as application or electronic service guide (ESG) may be, for example, transported over a ROUTE session.

Of the upper layer adjacent to ROUTE, the layer other than those described above is DASH Segment (ISO BMFF). Also, the upper layer adjacent to the DASH Segment (ISO BMFF) is DASH Player/Decoders. That is, in a case where ROUTE is used as a transport protocol, stream data of a service component (e.g., video, audio, subtitle) making up content such as broadcast program is transported over a ROUTE session in units of a DASH Segment compliant with the ISO BMFF (ISO Base Media File Format) standard.

On the other hand, MMTP is a protocol for streaming file transfer. Part of the upper layer adjacent to MMTP is signaling (MMTP specific Signaling). Metadata such as USED (User Service Bundle Description) and MPT (MMT Package Table) is included as this signaling.

Of the upper layers adjacent to MMTP, the layer other than signaling is MPU (Media Processing Unit) (ISO BMFF). Also, the upper layer adjacent to MPU (ISO BMFF) is DASH Player/Decoders. That is, in a case where MMT is used as a transport protocol, stream data of a service component (e.g., video, audio, subtitle) making up content such as broadcast program is transported over an MMTP session in units of an MPU compliant with the ISO BMFF (ISO Base Media File Format) standard.

Thus, in the protocol stack depicted in FIG. 2, both ROUTE and MMTP are represented as a transport protocol. In unidirectional broadcasting-based streaming delivery, therefore, one of the two protocols, namely, ROUTE that transports a DASH Segment (ISO BMFF) file or MMTP that transports an MPU (ISO BMFF) file, is used.

Also, in a case where bidirectional communication is used, the layer above the physical layer (Broadband) is the IP layer that corresponds to the network layer. Also, the upper layer adjacent to the IP layer is a TCP (Transmission Control Protocol) layer that corresponds to the transport layer, and further, an upper layer adjacent to the TCP layer is an HTTP layer that corresponds to an application layer. That is, thanks to these layers, TCP/IP and other protocols working in networks such as the Internet 90 are implemented.

Part of the upper layer adjacent to the HTTP layer is signaling (All Signaling Objects) and NRT content (NRT Files). This signaling includes all signaling such as signaling transported by ROUTE and MMTP described above. Also, NRT content is an example of content acquired via communication, and content such as application may be, for example, transported.

Of the upper layer adjacent to the HTTP layer, the layer other than those described above is DASH Segment (ISO BMFF). Further, the upper layer adjacent to the DASH Segment (ISO BMFF) is DASH Player/Decoders. That is, in bidirectional communication-based streaming delivery, stream data of a service component (e.g., video, audio, subtitle) making up content such as VOD program is transported in units of a DASH Segment compliant with the ISO BMFF standard.

Also, applications can be transported by using a unidirectional broadcasting protocol such as ROUTE or MMTP and a bidirectional communication protocol such as TCP/IP. For example, these applications can be those developed with HTML5 or JS (JavaScript (registered trademark)).

It should be noted that, in FIG. 2, HTTP Proxy is written in part of ROUTE because, in the case of acquisition of a DASH Segment (ISO BMFF) file by an application, implementation is assumed in which broadcast middleware implemented in the client apparatus 40 behaves as an HTTP server. Also, in FIG. 2, EME/CENC (Encrypted Media Extension/Common Encryption Scheme) compliant with W3C (World Wide Web Consortium) and MPEG (Moving Picture Experts Group) is adopted as a security framework for content protection. Therefore, EME/CENC is written in part of DASH Segment (ISO BMFF) and MPU (ISO BMFF).

Also, metadata including SLT metadata as LLS signaling and USBD, S-TSID, MPD, and AST as SLS signaling are written in a markup language such as XML (Extensible Markup Language).

As described above, in the protocol stack of the IP transport scheme of the present technology, unidirectional broadcasting-based layers and some of bidirectional communication-based layers serve as a common protocol, allowing stream data of a service component making up content to be transported through unidirectional broadcasting and bidirectional communication in units of a DASH Segment compliant with the ISO BMFF standard. For this reason, in a case where both unidirectional broadcasting-based streaming delivery and bidirectional communication-based streaming delivery take place, implementation load and processing load can be reduced, for example, in the broadcast server 20 and the client apparatus 40 because the upper layer protocol has been commonized.

(ROUTE Structure)

Figure 3:
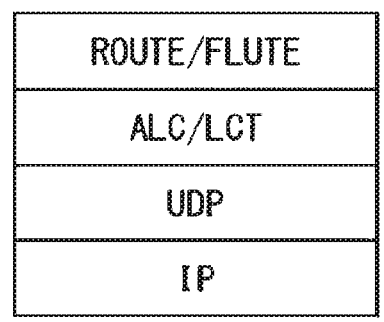
FIG. 3 is a diagram illustrating a ROUTE/FLUTE structure.

FIG. 3 is a diagram illustrating a ROUTE structure. It should be noted, however, that, in FIG. 3, FLUTE is also written for comparison with ROUTE.

FLUTE includes a scalable multicast protocol for file objects called ALC (Asynchronous Layered Coding), and specifically, it includes a combination of LCT (Layered Coding Transport) and FEC (Forward Error Correction) components, building blocks of ALC.

Here, ALC is a protocol suited for unidirectional multicast transport of an arbitrary binary file. That is, although developed as a highly reliable asynchronous one-to-many broadcasting-based protocol, ALC uses LCT and FEC. As a result, a target file is subjected to FEC and placed into an LCT packet, and where it is transported over IP multicast, it is placed into a UDP packet and an IP packet.

FLUTE transport session is identified by a unique TSI (Transport Session Identifier) scoped by the sender's IP address. In FLUTE, the FEC scheme can be changed for each transport session or file. Also, FLUTE comes with transport control information in XML format called FDT (File Delivery Table) that is transported for each transport session.

A basic attribute and a transport control parameter of a target file are written in an FDT file to be transported over the same transport session as for an FEC encoding symbol contained in the LCT packet. FDT can define mapping between a target file identifier and an LCT packet string into which corresponding FEC encoding symbol string has been placed and further store a MIME type and size, transport coding scheme, message digest, parameters required for FEC decoding, and so on for content of each file. It should be noted that FDT itself can be subjected to FEC and that its own FEC parameters, for example, are transported separately over an LCT layer.

Figure 4:
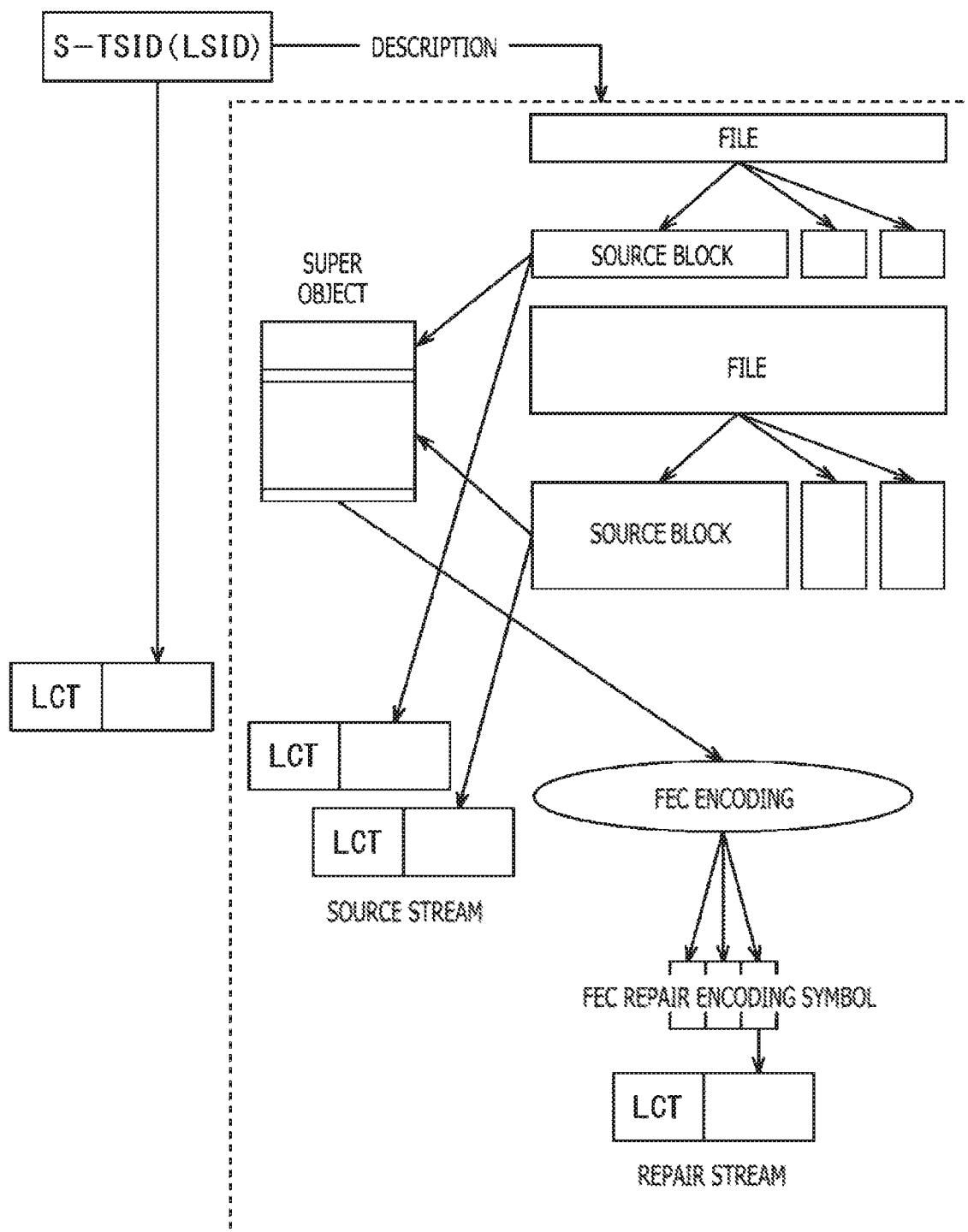
FIG. 4 is a diagram illustrating a detailed ROUTE structure.

Incidentally, ROUTE is an extension of FLUTE, and object bundle and media-aware fragmentation can be cited as main differences therebetween. FIG. 4 illustrates a detailed ROUTE structure.

The ROUTE's object bundle is characterized in that it supports, at the protocol level, a method of configuring a single super object by bundling together video and audio streams made up of source blocks of different sizes and generating an FEC repair stream based on the super object and notification of a relationship between a source stream and the repair stream.

In general, audio streams and the like are small in data amount (have a small data object) per unit time. As a result, audio streams are smaller than video streams in terms of source object size. Generating a repair symbol for these streams having source objects of different sizes using the same FEC scheme for each stream results in different error sensitivity depending on the magnitude of source object size.

ROUTE allows a super object to be configured by cutting out source blocks from source streams having different rates, thereby permitting a repair stream to be configured using an FEC repair symbol generated on the basis of the super object. That is, a repair stream is generated that spans different kinds of source streams. Here, source streams made up of source symbols and a repair stream made up of repair symbols can be transported as different LCT sessions within a ROUTE session.

Information (control information) related to how an FEC stream is generated by configuring a super object from source blocks cut out from a plurality of source streams is written in S-TSID metadata, an extension of LSID (FDT). The receiving side can extract the target file by reconstructing the super object from an LCT packet string transported over the ROUTE session based on the information written in this S-TSID metadata.

In general, a broadcast stream is a model in which the transmitter side multiplexes and sends all streams making up a service and the receiver side selects streams required for the receiver itself. Therefore, the FEC configuration method realized by ROUTE is effective in a use case where a processing model of configuring a super object made up of all streams making up a service on the transmitter side and reconstructing the super object and selecting necessary streams on the receiving side is applicable.

Hitherto, a description has been given of ROUTE, an extension of FLUTE.

<2. Overview of Cache Quota Domain>

Incidentally, in order to improve performance of access to applications accompanying a specific service such as broadcast program in the client apparatus 40, it is necessary to cache necessary files in a local cache in advance. For example, ATSC 3.0 assumes a model in which all files acquired via broadcasting or communication are temporarily accumulated in a local cache on a local file system of the client apparatus 40 and provided to a stream renderer and an application.

Also, in the client apparatus 40, all files in receivable broadcast waves cannot be cached due to tuner and storage resource limitations. Therefore, a type of operation is assumed in which only a group of files required for a tuned service at that point are acquired and cached and, in a case where the service (channel) is switched over to other service, the storage resource is released immediately.

On the other hand, if, of those files transported in a service, an advertisement content file, a file commonly used in all services, for example, can be shared among a plurality of services, advantages can be offered such as effective use of cache storage area and delivery band. For this reason, proposals have been requested for sharing of resources that are reused among a plurality of services. The present technology introduces a cache quota domain concept, allowing for sharing of resources reused among a plurality of services in the client apparatus 40 by transporting a quota domain identifier for identifying a cache quota domain as signaling.

(Overview of Cache Quota Domain)

Figure 5:
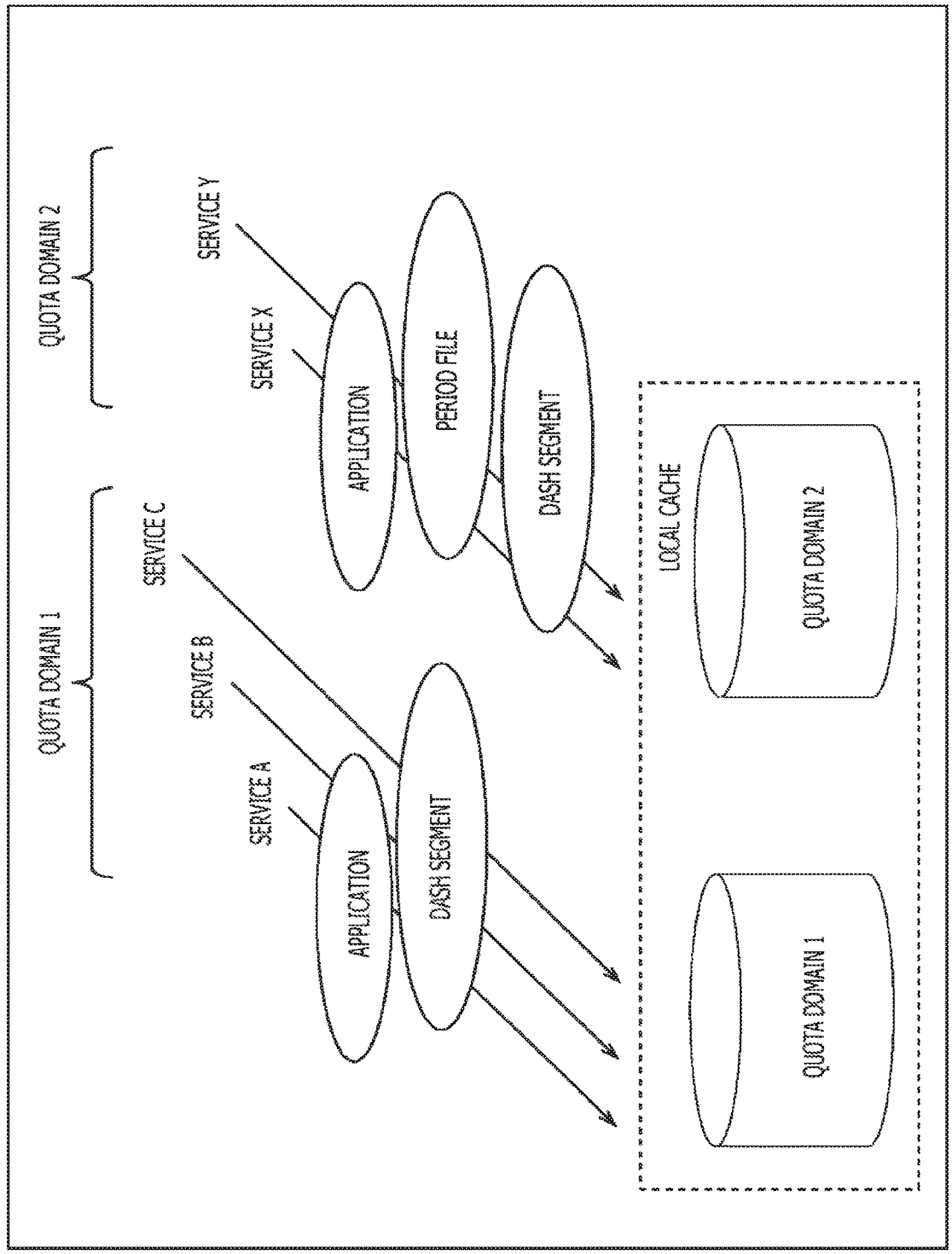
FIG. 5 is a diagram illustrating an overview of a cache quota domain.

FIG. 5 is a diagram illustrating an overview of a cache quota domain.

A cache quota domain is a domain (group) for sharing reused resources. FIG. 5 illustrates a case in which service A, service B, and service C belong to quota domain 1, and service X and service Y belong to quota domain 2. It should be noted that the storage area of the local cache depicted in FIG. 5 is equivalent to that of a persistent cache 404B of a local cache 404 depicted in FIG. 25 which will be described later.

In this case, applications, DASH Segments, and other files shared by services A to C that belong to quota domain 1 are cached in the storage area allocated to quota domain 1 of the local cache in the client apparatus 40. That is, the files shared by the services that belong to quota domain 1 are cached in the storage area of the local cache identified by quota domain 1 (quota domain identifier thereof). As a result, the files in the storage area in question can be acquired and processed (reproduced) in the services that belong to quota domain 1.

On the other hand, applications, DASH segments, period files, and other files shared by services X and Y that belong to quota domain 2 are cached in the storage area allocated to quota domain 2 of the local cache. That is, the files shared by the services that belong to quota domain 2 are cached in the storage area of the local cache identified by quota domain 2 (quota domain identifier thereof). As a result, the files in the storage area in question can be acquired and processed (reproduced) in the services that belong to quota domain 2.

It should be noted, however, that each service cannot stretch beyond the quota domain to which it belongs to access resources of other quota domain. For example, services A to C that belong to quota domain 1 cannot access the resources of quota domain 2, and services X and Y that belong to quota domain 2 cannot access the resources of quota domain 1.

Thus, by introducing the cache quota domain concept, it is possible for the services belonging to each quota domain to share and use (reuse) the resources available in the quota domain to which they belong.

For example, if a plurality of services provided by a single broadcasting station or a plurality of services provided by a broadcasting station alliance organized by a plurality of broadcasting stations can share resources (files) for each cache quota domain by belonging to the same cache quota domain.

(Arrangement Example of Quota Domain Identifiers)

Figure 6:
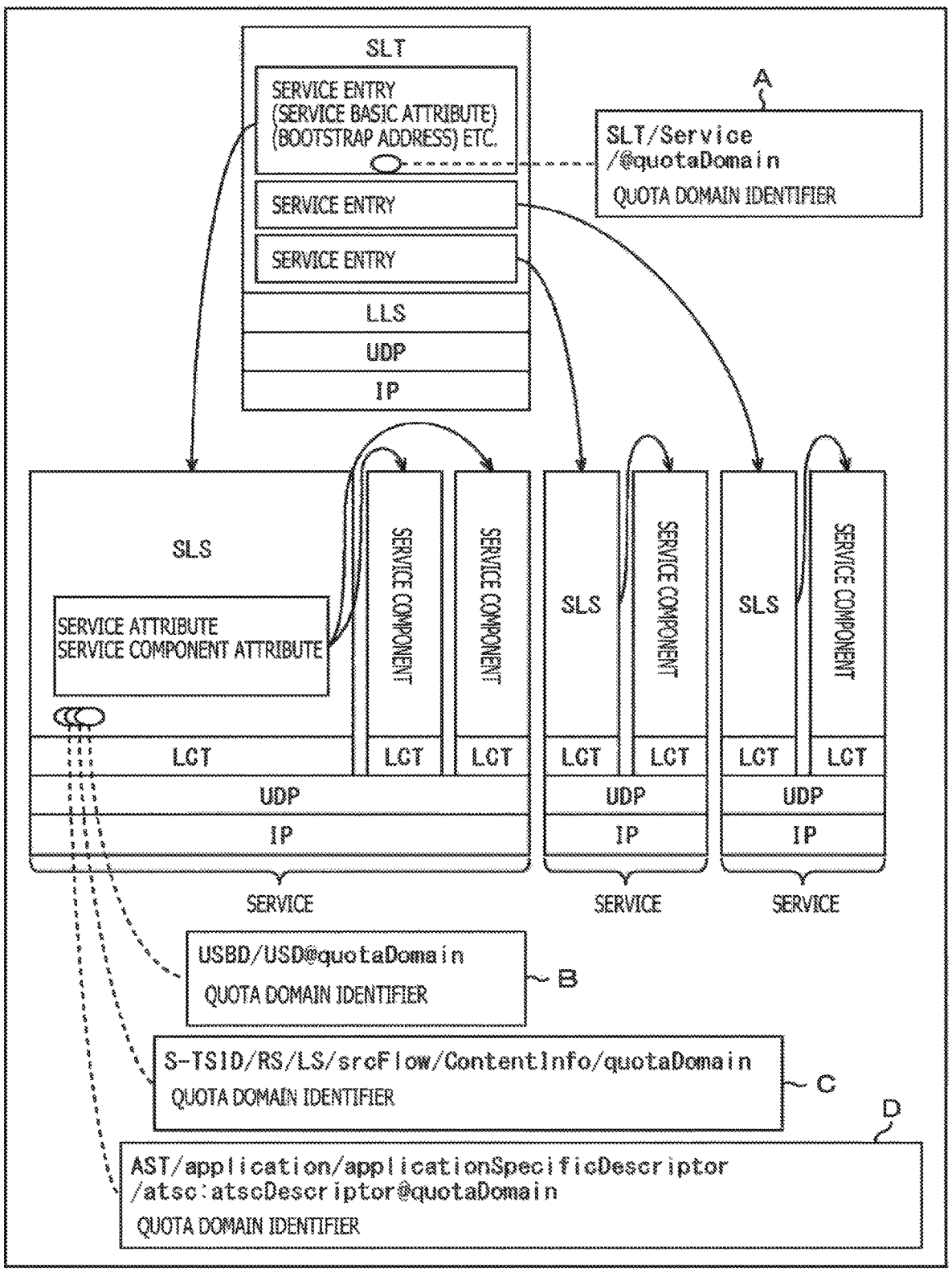
FIG. 6 is a diagram illustrating arrangement of quota domain identifiers.

FIG. 6 is a diagram illustrating an arrangement example of quota domain identifiers.

A quota domain identifier for identifying a cache quota domain can be transported by signaling that is transported by each layer of a broadcast wave. That is, by adding an attribute (or element) that can specify a quota domain identifier of the cache quota domain to which a target service belongs in signaling, it is possible to share a resource (file) among services that belong to the same cache quota domain based on the quota domain identifier included in signaling in the client apparatus 40.

As illustrated in FIG. 6, by extending SLT metadata, LLS signaling, contained in the payload of an IP/UDP packet, USBD metadata S-TSID metadata, or AST metadata, SLS signaling, contained in the payload of an IP/UDP packet and transported over an LCT session, a quota domain identifier can be arranged therein.

(A) Arrangement in SLT Metadata

Where a quota domain identifier of a cache quota domain is specified by extending SLT metadata, SLT metadata can specify a plurality of service attributes. Therefore, an attribute (or element) that can specify the quota domain identifier is added as an attribute of a target service. Here, for example, the quota domain identifier of the cache quota domain to which a target service belongs can be specified by defining a quotaDomain attribute in a service element of SLT metadata.

For example, where services A to Z are provided, the quota domain identifier of quota domain 1 (FIG. 5) is specified as the quotaDomain attribute of the service element for which a service ID of services A to C is specified in SLT metadata. Also, in this SLT metadata, the quota domain identifier of quota domain 2 (FIG. 5) is specified as the quotaDomain attribute of the service element for which a service ID of services X and Y is specified.

Thus, it is possible to specify a quota domain identifier on a service-by-service basis by defining the quotaDomain attribute in the service element in SLT metadata.

(B) Arrangement in USBD Metadata

Where a quota domain identifier of a cache quota domain is specified by extending USBD metadata, the quota domain identifier of the cache quota domain to which a target service belongs can be specified by defining the quotaDomain attribute in a USD element of USBD metadata.

For example, where services A to Z are provided, the quota domain identifier of quota domain 1 (FIG. 5) is specified as the quotaDomain attribute of the USD element in USBD metadata of services A to C. Also, for example, in USBD metadata of services X and Y, the quota domain identifier of quota domain 2 (FIG. 5) is specified as the quotaDomain attribute of the USD element.

Thus, it is possible to specify a quota domain identifier on a service-by-service basis by defining the quotaDomain attribute in the USD element in USBD metadata.

(C) Arrangement in S-TSID Metadata

Where a quota domain identifier of a cache quota domain is specified by extending S-TSID metadata, the quota domain identifier of the cache quota domain to which a target LCT session belongs can be specified by defining the quotaDomain attribute in a ContentInfo element of an srcFlow element of an LS element of an RS element of S-TSID metadata.

Thus, it is possible to specify a quota domain identifier on an LCT-session-by-LCT-session basis by defining the quotaDomain attribute in the ContentInfo element of the srcFlow element of the LS element of the RS element of S-TSID metadata.

(D) Arrangement in AST Metadata

Where a quota domain identifier of a cache quota domain is specified by extending AST metadata, the quota domain identifier of the cache quota domain to which a target application belongs can be specified by defining the quotaDomain attribute in an atsc:atscDescriptor element of an applicationSpecificDescriptor element of an Application element of AST metadata.

Thus, it is possible to specify a quota domain identifier on an application-by-application basis by defining the quotaDomain attribute in the atsc:atscDescriptor element of the applicationSpecificDescriptor element of the Application element of AST metadata.

As described above, by specifying a quota domain identifier by extending SLT metadata, USBD metadata, S-TSID metadata, or AST metadata, it is possible to share a resource (file) on a service-by-service, on an LCT-session-by-LCT-session, or on an application-by-application basis within the same cache quota domain.

Figure 7:
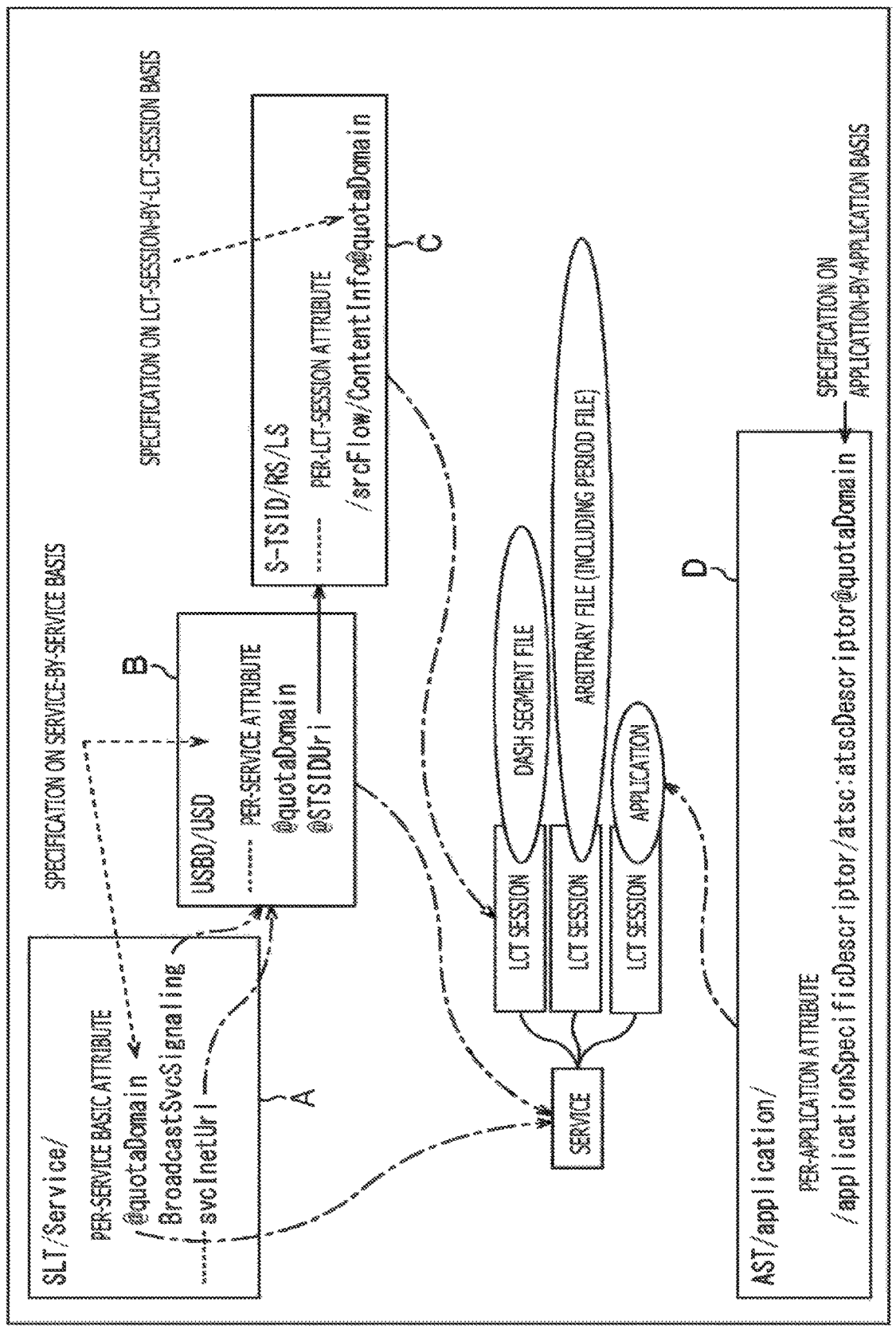
FIG. 7 is a diagram illustrating a method of specifying quota domain identifiers.

That is, as illustrated in FIG. 7, each service includes one or a plurality of sessions, and a LASH segment or application file or an arbitrary file, for example, is transported over each LCT session.

Here, in a case where sharing of resources on a service-by-service basis is desired as depicted in FIG. 7, a quotaDomain attribute is defined by extending SLT metadata service entry (per-service basic attribute) or USBD metadata's per-service attribute. That is, the quota domain identifier for identifying a storage area of the local cache that stores files that are transported in a target service corresponds to the character string specified by the quotaDomain attribute of SLT metadata or USBD metadata. It should be noted that files in this case are, for example, files such as applications, DASH segments, or period files and include not only files acquired via broadcasting but also those acquired via communication.

Figure 8:
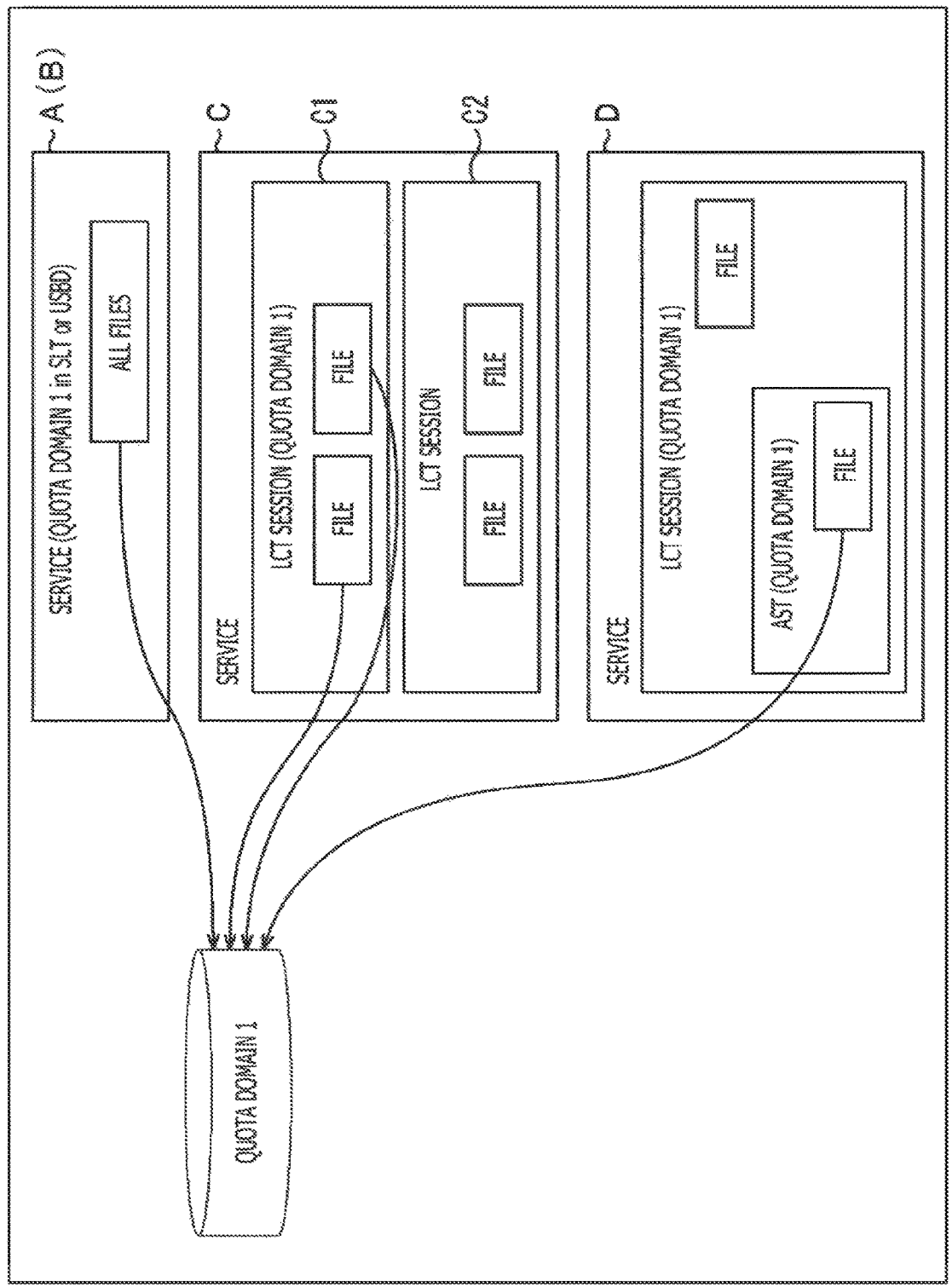
FIG. 8 is a diagram illustrating a relationship between quota domain identifier specification and file cache.

It should be noted, however, that in a case where a cache quota domain (e.g., quota domain 1) is specified at the service level by the quotaDomain attribute of SLT metadata or USBD metadata, and where an instruction is issued that all files transported over an LCT session that belongs to a target service be cached in a local cache (persistent cache thereof), all the files are cached in the storage area allocated to a cache quota domain (e.g., quota domain 1) of the local cache (A (B) in FIG. 8).

It should be noted that although details will be described later with reference to the SLT metadata format depicted in FIG. 15, SLS signaling location information is specified in the service element of SLT metadata. Then, in a case where SLS signaling is acquired via broadcasting, this location information is specified by a BroadcastSvcSignaling element. Where SLS signaling is acquired via communication, this location information is specified by an SvcInetUrl element. For example, USBD metadata is acquired via broadcasting or communication in accordance with location information of the service element of SLT metadata.

Also, in a case where sharing of resources on an LCT-session-by-LCT-session basis is desired as illustrated in FIG. 7, a quotaDomain attribute is defined by extending S-TSID metadata's per-LCT-session attribute. That is, the quota domain identifier for identifying a storage area of the local cache that stores files that are transported over a target LCT session corresponds to the character string specified by the quotaDomain attribute of S-TSID metadata. It should be noted that files in this case are, for example, files such as applications, DASH segments, or period files.

It should be noted, however, that in a case where a cache quota domain (e.g., quota domain 1) is specified at the LCT session level by the quotaDomain attribute of S-TSID metadata, it is recognized that the service to which the target LCT session belongs belongs to the cache quota domain (e.g., quota domain 1).

Then, where an instruction is issued that files transported over an LCT session whose cache quota domain (e.g., quota domain 1) has been specified be cached in a local cache (persistent cache thereof), those files are cached in the storage area of a cache quota domain (e.g., quota domain 1) of the local cache (C1 in FIG. 8). On the other hand, even when an LCT session belongs to the same service as the LCT session whose cache quota domain (e.g., quota domain 1) has been specified, if no cache quota domain is specified for that LCT session, files are not persistently cached (C2 in FIG. 8).

It should be noted that although details will be described later with reference to the USBD metadata format depicted in FIG. 16, a URI (Uniform Resource Identifier) indicating an acquisition destination of S-TSID metadata is specified in an STSIDUri attribute of the USD element of USBD metadata. Then, S-TSID metadata is acquired in accordance with this URI.

Also, where sharing of resources on an application-by-application basis is desired as illustrated in FIG. 7, a quotaDomain attribute is defined by extending AST metadata's per-application attribute. That is, the quota domain identifier for identifying a storage area of the local cache that stores files of an application to be written in target AST metadata corresponds to the character string specified by the quotaDomain attribute of AST metadata.

It should be noted, however, that where a cache quota domain (e.g., quota domain 1) is specified at the application level by the quotaDomain attribute of AST metadata, it is recognized that the service to which the target application belongs belongs to the cache quota domain (e.g., quota domain 1).

Then, where an instruction is issued that files of the application whose cache quota domain (e.g., quota domain 1) has been specified be cached in a local cache (persistent cache thereof), those files are cached in the storage area of a cache quota domain (e.g., quota domain 1) of the local cache (D in FIG. 8). On the other hand, even when an application belongs to the same service as the application whose cache quota domain (e.g., quota domain 1) has been specified, if no cache quota domain is specified for that application, files are not persistently cached.

Thus, by introducing the cache quota domain concept and transporting a quota domain identifier (resource sharing information) for identifying a cache quota domain included in SLT, USBD, S-TSID, AST, or other metadata (control information), it is possible for the client apparatus 40 to hold a file (resource) included in services that belong to the same cache quota domain in a local cache (persistent cache thereof) and share the file (resource) on a service-by-service, LCT-session-by-LCT-session, or application-by-application basis.

<3. Application Example of Application>

A description will be given next of a case in which a cache quota domain is implemented in a system that inserts second content (advertisement) using an application transported together with first content (broadcast program) with reference to FIGS. 9 to 14. It should be noted that the application in question is designed to achieve ad-insertion control by executing a script. Therefore, the application will be hereinafter referred to as a script app in the description given below.

(Flow of Advertisement Insertion)

Figure 9:
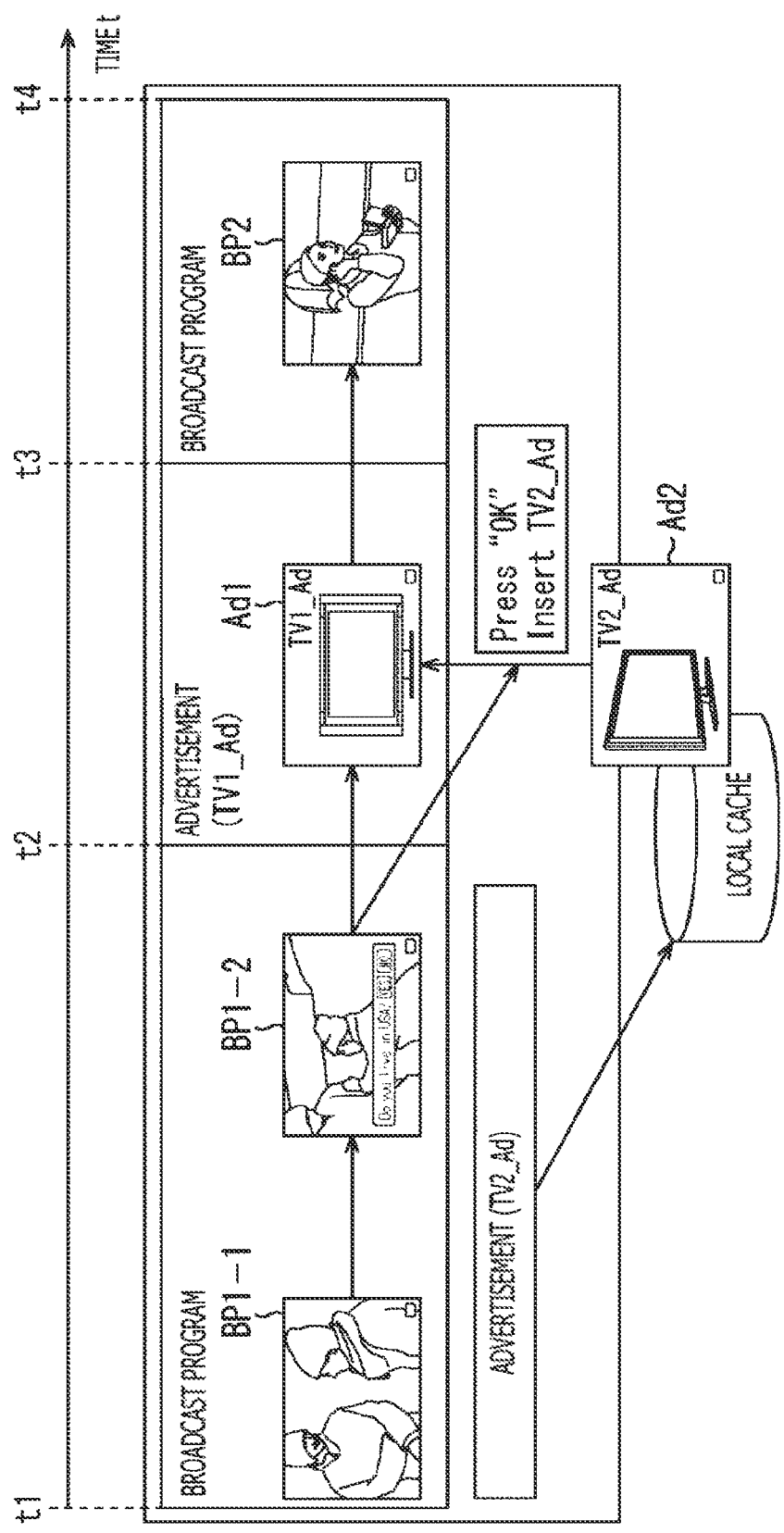
FIG. 9 is a diagram illustrating a flow of advertisement insertion.

FIG. 9 is a diagram illustrating a flow of advertisement insertion.

FIG. 9 depicts a case in which an advertisement (TV2_Ad) suited to the user is inserted in place of a default advertisement (TV1_Ad) reproduced between broadcast programs (BP1, BP2) in the client apparatus 40.

In a case where the direction of time is from left to right in the figure, an advertisement Ad1 acquired in realtime is normally reproduced from time t2 to time t3 between a time period from time t1 to time t2 during which the broadcast program BP1 is reproduced and a time period from time t3 to time t4 during which the broadcast program BP2 is reproduced.

Also, although two kinds of advertisements, namely, the default advertisement Ad1 and the insertion advertisement Ad2, are available in this example, the advertisement Ad2 is acquired via broadcasting or communication and cached in the local cache (persistent cache thereof) while a broadcast program BP1-1 is reproduced from time t1 to time t2, that is, timewise before an advertisement insertion interval.

In the client apparatus 40, when a scene of a broadcast program BP1-2 appears, a question to the user is displayed superimposed on the image. Then, the client apparatus 40 displays an advertisement suited to the user in question in response to the user's answer to the question. In the client apparatus 40, for example, where the user answers the question, the insertion advertisement Ad2 that matches the answer is read from the local cache (persistent cache thereof), and then the default advertisement Ad1 is replaced by the advertisement Ad2 suited to the user.

Thus, by caching an advertisement that is more likely to be viewed by the user in the local cache of the client apparatus 40 (persistent cache thereof), it is possible to display an advertisement suited to the user by using the cached advertisement.

It should be noted that although, in the example of advertisement insertion depicted in FIG. 9, a case was depicted in which advertisement content suited to the user was selected in response to input operation of the user, advertisement content may be selected using information (e.g., sex, age, residential area) related to user characteristics specified in advance such as user preference or profile in addition to such exchange of information (interaction) with the user.

Incidentally, 3GPP (Third Generation Partnership Project) and DASH-IF (Industry Forum), standardization projects for mobile communication system, follow the footsteps of an ad-insertion control realization method personalized by Period element XLink that is prescribed by MPEG-DASH. It is assumed that ATSC 3.0 will also follow the footsteps of this ad-insertion control realization method. It should be noted that XLink is a specification for defining a link between XML documents and advised by W3C (World Wide Web Consortium).

This ad-insertion control adopts a method of making available a file for an MPD metadata advertisement insertion interval in advance and dynamically changing the Period element for specifying a segment for an advertisement content stream in accordance with user characteristic (e.g., user preference). The client apparatus 40 that supports such ad-insertion control is depicted in FIG. 10.

Figure 10:
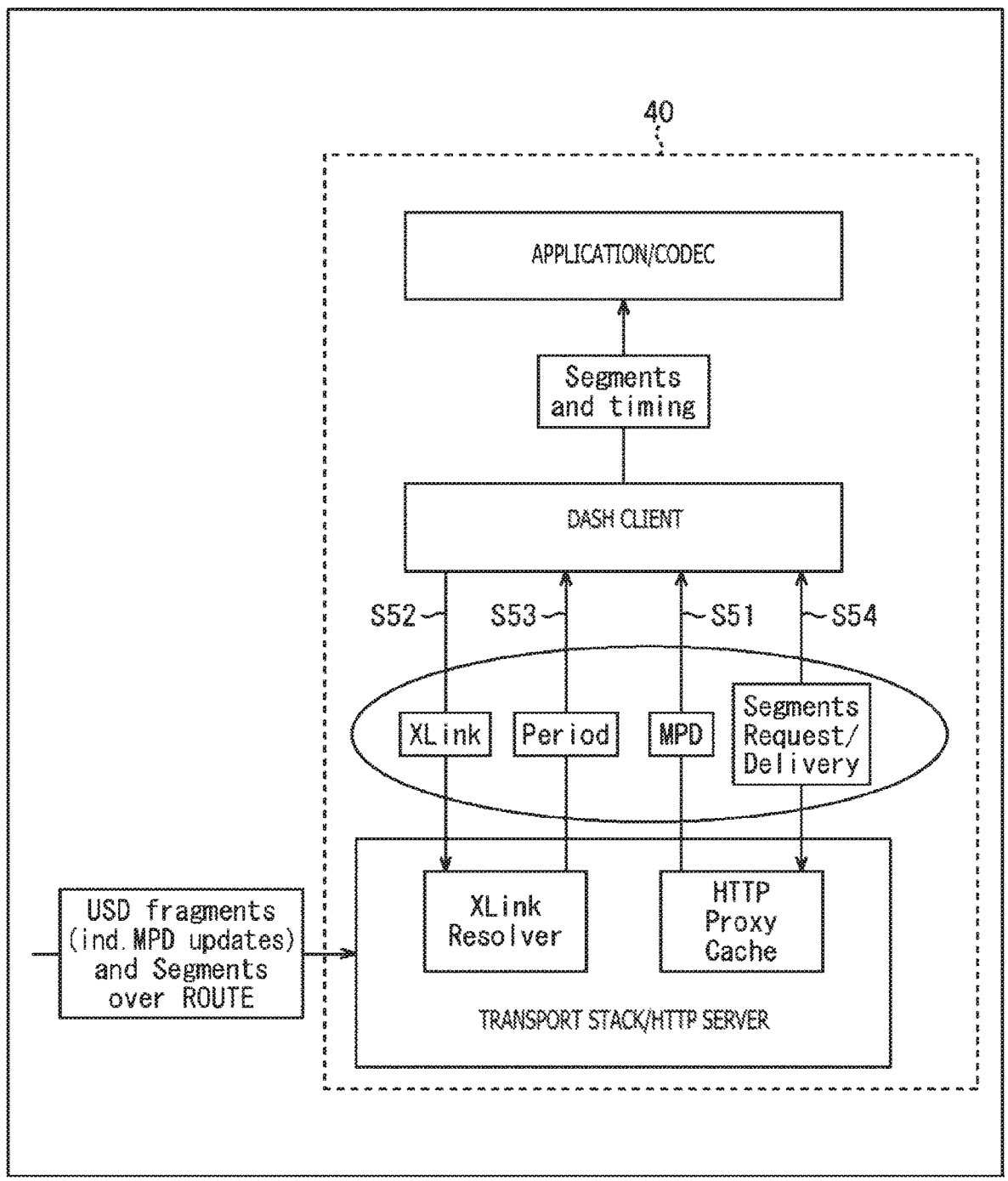
FIG. 10 is a diagram illustrating a flow of processes in an upper layer on a receiving side.

In FIG. 10, the client apparatus 40 has an application/codec capability, a DASH client capability, and a transport stack/HTTP server capability. Also, the transport stack/HTTP server capability includes an)(Link resolver capability and an HTTP proxy cache capability. It should be noted, however, that the HTTP server of the communication server 30 may have the XLink resolver capability.

Here, in a case where MPD metadata to be transported as SLS signaling is received by the client apparatus 40, the MPD metadata is acquired by an HTTP proxy cache, and then the DASH client is notified (S51). In this MPD metadata, a URL (Uniform Resource Locator) is specified that is to be resolved by the XLink resolver that runs on the HTTP server of the client apparatus 40 or the communication server 30 as an xlink:href attribute of the Period element.

Specifically, focusing attention to the Period element, of A1 (Ad Break #1), M1 (Main Program), A2 (Ad Break #2), M2 (Main Program), A3 (Ad Break #3), and M3 (Main Program), the Period elements written in MPD metadata, as illustrated in FIG. 11, "http://adservice.com/adp-1?user=$groupID$" is written as an xlink:href attribute URL.

It should be noted that "http://adservice.com/adp-1?user=$groupID$" is also written as an xlink:href attribute URL in A2 (Ad Break #2) or A3 (Ad Break #3) and that the URL is processed similarly to A1 (Ad Break #1).

Referring back to the description of FIG. 10, in the client apparatus 40, an HTTP request is issued to the XLink resolver on the HTTP server of the client apparatus 40 or the communication server 30 by inserting a value identifying the user in the parameter portion of the groupID of this URL (S52). For example, a URL with a groupID value inserted therein such as "http://adservice.com/adp-1?user=classA" is notified to the XLink resolver.

When the URL with a groupID value inserted therein is notified from the DASH client, the XLink resolver of the client apparatus 40 or the communication server 30 returns, to the DASH client, a Period element file (hereinafter referred to as a period file) including a URL generated for a specific user (e.g., classA user) identified by the groupID (S53). The URL included in this Period element is a URL of a segment (segment URL) delivered using the ROUTE protocol in the case of delivery via unidirectional broadcasting and using the HTTP protocol in the case of delivery via bidirectional communication.

Then, in the client apparatus 40, the DASH client and the HTTP proxy cache engage in interaction such as requesting and delivering a segment in accordance with the Period element of the period file acquired by the process in step S53. As a result, a segment that matches the segment URL of the Period element is acquired (S54).

Advertisement content that matches the segment acquired in this manner is reproduced during the advertisement insertion interval (e.g., interval from time t2 to time t3 in FIG. 9).

Figure 12:
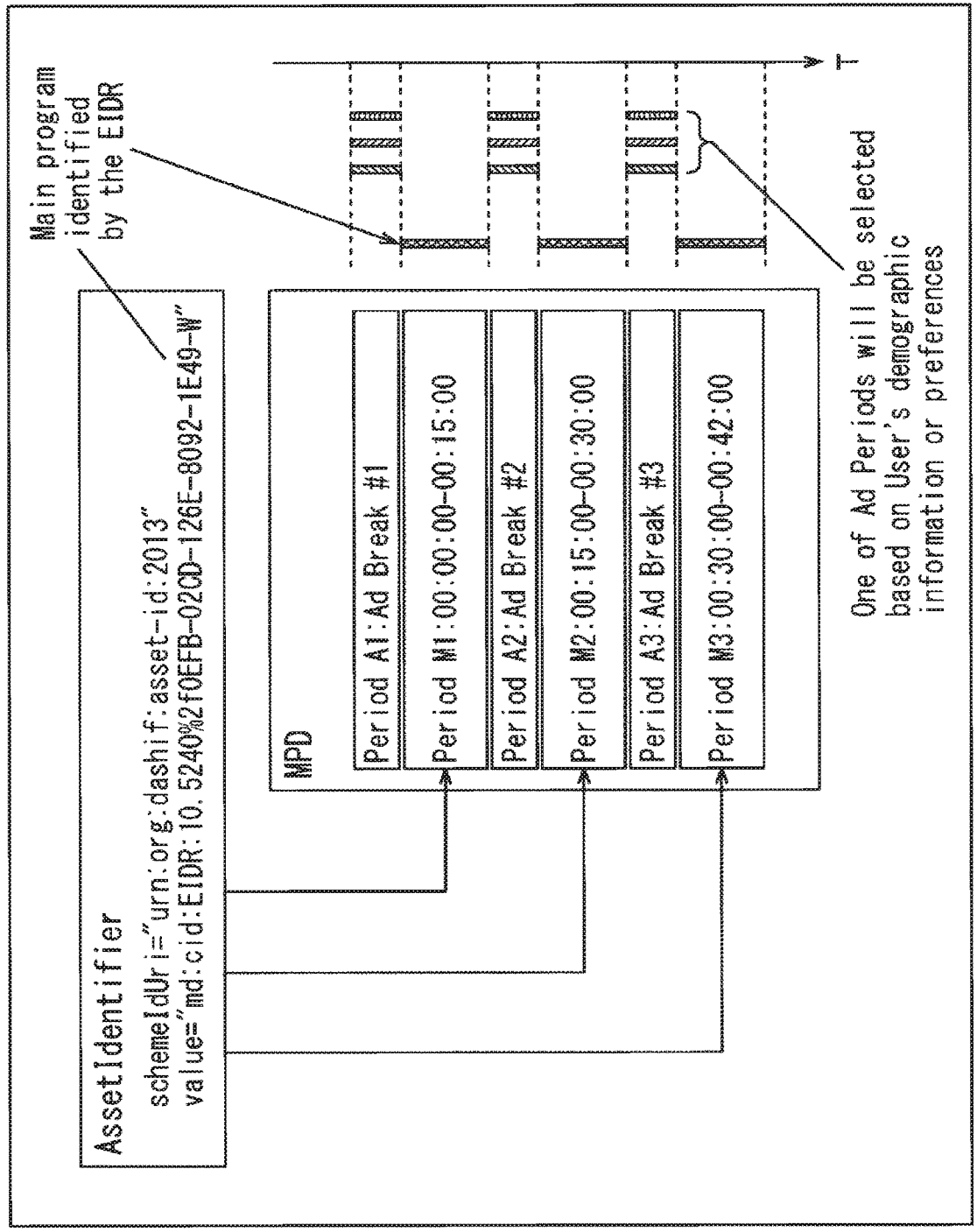
FIG. 12 is a diagram describing chronological advertisement insertion control using MPD metadata.

More specifically, FIG. 12 illustrates ad-insertion control that inserts A1 (Ad Break #1) timewise before M1 reproduction, inserts A2 (Ad Break #2) between M1 and M2, and inserts A3 (Ad Break #3) between M2 and M3 where M1 (Main Program) is reproduced from 00:00:00 to 00:15:00, M2 (Main Program) is reproduced from 00:15:00 to 00:30:00, and M3 (Main Program) is reproduced from 00:30:00 to 00:42:00.

In this example, three kinds of advertisements are available as A1 (Ad Break #1), and the content of advertisement to be reproduced changes dynamically in accordance with the user characteristic (e.g., user preference) such as male in his 30s or female in her 60s. Similarly, a plurality of advertisements are available as A2 (Ad Break #2) and A3

(Ad Break #3), allowing an advertisement that matches the user characteristic to be reproduced.

It should be noted that although, in FIG. 10, an example was described in which the XLink resolver ran on the HTTP server of the client apparatus 40 or the communication server 30, a script application can play a role of the XLink resolver in the client apparatus 40.

That is, where the DASH client detects a URL of an xlink:href attribute of the Period element for advertisement insertion by parsing (analyzing the syntax of) MPD metadata, the URL thereof is notified to the script application rather than immediately sending an HTTP request to the XLink resolver running on the HTTP server.

When the URL is notified from the DASH client (when XLink resolution is requested), the script application selects, of pieces of possible advertisement content (Ad segments) for insertion for that interval, the one suited to the target user (Ad segment), on the basis of information for identifying an advertisement insertion interval reflected in the path portion or query character string of the URL.

Then, the script application generates a period file including the Period element appropriate to the selected piece of advertisement content (Ad segment) and replies to the DASH client. For example, the Period element of this period file includes the URL generated for a specific user (e.g., classA user) specified by the groupID, and when a group of Ad segments are reproduced, the advertisement content is reproduced, on the basis of the list of the segment URL.

Here, as for the selection of advertisement content suited to the user, for example, the selection may be made in some cases in accordance with user preferences managed by the client apparatus 40 or in other cases in accordance with information acquired as required as a result of exchange of information (interaction) with the user. For example, in the case of advertisement insertion depicted in FIG. 9 described above, advertisement content suited to the user is selected in accordance with user input operation.

Thus, resolving XLink of the Period element of MPD metadata on the side of the client apparatus 40 eliminates the need to request XLink resolution to the XLink resolver that runs on the HTTP server of the communication server 30.

For this reason, in a case where XLink is revolved by the XLink resolver of the communication server 30, concentration of access to the communication server 30 from a number of client apparatuses 40 connected to the Internet 90 is expected immediately before the advertisement insertion interval. However, XLink resolution using the XLink resolver of the client apparatus 40 eliminates increase in transaction processing load for XLink resolution.

Also, in the client apparatus 40, it is possible to ensure reliability of advertisement insertion through ad-insertion control by caching pieces of possible advertisement content (Ad segments), acquired via broadcasting or communication, in the local cache (persistent cache thereof) timewise before the advertisement insertion interval. For example, in a case where advertisement content (Ad segment) is acquired via communication, there is a possibility that advertisement content (Ad segments) may not be acquired depending on the communication condition of the Internet 90 and so on. However, caching advertisement content (Ad segments) in advance contributes to more reliable advertisement insertion through ad-insertion control.

Further, the present technology introduces the cache quota domain concept, allowing for sharing of an advertisement content (Ad segment) file reused among a plurality of services in the client apparatus 40. This contributes to improved reusability of possible advertisement content (Ad segment) cached in the local cache (persistent cache thereof), allowing for more reliable advertisement insertion through ad-insertion control.

(MPD Description Examples)

A description will be given next of description examples of MPD metadata in XML format with reference to FIGS. 13 and 14.

It should be noted that the Period element, an AdaptationSet element, and a Representation element are written in hierarchical structure in MPD metadata. The Period element serves as a unit of writing a configuration of a service such as content. Also, the AdaptationSet element and the Representation element are used for each service component stream such as video, audio, subtitle, and so on and permit writing of respective stream attributes of these elements.

In the description example of MPD metadata depicted in FIG. 13, the Period element of a main program and the Period element of an advertisement (Ad) are written.

Information for managing reproduction of the main program content (video file in MP4 format) is written in the Period element of the main program. It should be noted, however, that an ID corresponding to the EIDR (Entertainment Identifier Registry) is assigned to a schemeIdUri attribute and a value attribute of an AssetIdentifier element.

In the Period element of the advertisement (Ad), on the other hand, a URL is written in the xlink:href attribute of the Period element (A in FIG. 13) together with information for managing reproduction of the default advertisement content (video file in MP4 format). This URL is notified to the XLink resolver that runs on the HTTP server of the communication server 30, allowing acquisition of an advertisement for insertion and replacement of the default advertisement with the advertisement for insertion.

In the metadata description example depicted in FIG. 14, the Period element of a main program and the Period element of an advertisement (Ad) are written.

Information for managing reproduction of the main program content (video file in MP4 format) is written in the Period element of the main program.

In the Period element of the advertisement (Ad), on the other hand, a URL is written in the xlink:href attribute of the Period element (A in FIG. 14) together with information for managing reproduction of the default advertisement content (video file in MP4 format). Here, a URL having a groupID value inserted therein is notified to the XLink resolver that runs on the HTTP server of the client apparatus 40, allowing acquisition of an advertisement suited to a specific user and replacement of the default advertisement with the advertisement suited to the user. It should be noted that "urn:atsc:ad-insertion" in A of FIG. 14 indicates that a request must be made to the script (script application) executed locally (by the client apparatus 40) to resolve ad-insertion control and that details thereof will be described later.

It should be noted that although sharing of an advertisement content (Ad segment) file among a plurality of services using a cache quota domain was described above by citing advertisement content as an example, the present technology is also applicable to other content in addition to advertisement. Also, a file is merely an example of a content resource, and any kind of data can be used as long as it can be processed by the client apparatus 40.

<4. Examples of Signaling>

A description will be given next of an example of a signaling format for transporting a quota domain identifier for identifying a cache quota domain with reference to FIGS. 15 to 21.

(SLT Format)

FIG. 15 is a diagram illustrating an example of an SLT metadata format in XML format. It should be noted that, of the elements and attributes in FIG. 15, the attributes are marked with "@." Also, the indented elements and attributes are specified for their upper element. These relationships are similarly to other signaling formats which will be described later.

An SLT element is a root element and is an upper element of a bsid attribute, an sltCapabilities attribute, an sltInetUrl element, and a Service element.

A broadcast stream ID is specified in the bsid attribute. Information related to necessary capabilities is specified in the sltCapabilities attribute.

A base URL for acquiring ESG or SLS signaling is specified in the sltInetUrl element. The sltInetUrl element is an upper element of a urlType attribute. A file type that can be used for the base URL is specified in the urlType attribute.

Information related to one or a plurality of services is specified in the Service element. The Service element is an upper element of a serviceId attribute, an sltSvcSeqNum attribute, a protected attribute, a majorChannelNo attribute, a minorChannelNo attribute, a serviceCategory attribute, a shortServiceName attribute, a hidden attribute, a broadbandAccessRequired attribute, an svcCapabilities attribute, a quotaDomain attribute, a BroadcastSvcSignaling element, and an svcInetUrl element.

A service ID is specified in the serviceId attribute. Information related to SLT metadata version is specified in the sltSvcSeqNum attribute. Encryption information indicating service protection is specified in the protected attribute.

A major channel number is specified in the majorChannelNo attribute. A minor channel number is specified in the minorChannelNo attribute. A service category is specified in the serviceCategory attribute. A short service name is specified in the shortServiceName attribute.

Whether a service is a hidden service is specified in the hidden attribute. Whether it is necessary to access a communication circuit such as the Internet 90 is specified in the broadbandAccessRequired attribute. Information related to necessary capabilities for decoding is specified in the svcCapabilities attribute.

A quota domain identifier of a cache quota domain to which a target service belongs is specified in the quotaDomain attribute. A resource (file) cached in the local memory is shared among services that belong to the same cache quota domain.

Information related to SLS signaling acquisition destination where the SLS signaling is acquired via broadcasting is specified in the BroadcastSvcSignaling element. The BroadcastSvcSignaling element is an upper element of an slsProtocol attribute, an slsMajorProtocolVersion attribute, an slsMinorProtocolVersion attribute, an slsPlpId attribute, an slsDestinationIpAddress attribute, an slsDestinationUdpPort attribute, and an slsSourceIpAddress attribute.

Information related to SLS signaling protocol is specified in the slsProtocol attribute. A major version number of an SLS signaling protocol is specified in the slsMajorProtocolVersion attribute. A minor version number of an SLS signaling protocol is specified in the slsMinorProtocolVersion attribute.

An ID of a PLP (Physical Layer Pipe) over which SLS signaling is transported is specified in the slsPlpId attribute. An IP address of an SLS signaling destination is specified in the slsDestinationIpAddress attribute. A port number of an SLS signaling destination is specified in the slsDestinationUdpPort attribute. An IP address of an SLS signaling source is specified in the slsSourceIpAddress attribute.

A URL of an SLS signaling acquisition destination is specified in the svcInetUrl element where SLS signaling is acquired via communication. The svcInetUrl element is an upper element of a urlType attribute. A file type that can be used for this URL is specified in the urlType attribute.

It should be noted that, as for the number of occurrences (Use) in FIG. 15, where "1" is specified, the element or the attribute is always specified only once, and that where "0 . . . 1" is specified, it is optional to specify the element or the attribute. Also, where "1 . . . N" is specified, the element or the attribute is specified once or more, and where "C . . . N" is specified, it is optional to specify the element or the attribute once or more.

Also, where "unsignedShort" or "unsignedByte" is specified as Data Type, it indicates that the value of the element or the attribute is of integer type. Where "string" is specified as Data Type, it indicates that the value of the element or the attribute is of character string type. Where "anyURI" is specified, it indicates that the value of the element or the attribute is a character string in URI format. Where "boolean" is specified as Data Type, it indicates that the value of the element or the attribute is of Boolean type. It should be noted that where "language" is specified as Data Type, it indicates that the value of the element or the attribute is valid as a value of an xml:lang attribute. Where "dateTime" is specified, it indicates that the value of the element or the attribute indicates a specific date and time.

(USBD Format)

FIG. 16 is a diagram illustrating an example of a USBD metadata in XML format.

A bundleDescription element is a root element and is an upper element of a userServiceDescription element (USD element). This userServiceDescription element is an upper element of a globalServiceID attribute, a serviceId attribute, a serviceStatus attribute, a fullMPDUri attribute, an sTSIDUri attribute, a quotaDomain attribute, a name element, a serviceLanguage element, a capabilityCode element, and a deliveryMethod element.

A global service ID is specified in the globalServiceID attribute. A service ID is specified in the serviceId attribute. Information related to service status is specified in the serviceStatus attribute. A URI for referring to MPD metadata is specified in the fullMPDUri attribute. A URI for referring to S-TSID metadata is specified in the sTSIDUri attribute.

A quota domain identifier of a cache quota domain to which a target service belongs is specified in the quotaDomain attribute. Services that belong to the same cache quota domain share a resource (file) cached in the local memory.

A name of an ATSC 3.0 service is specified in the name element. The name element is an upper element of a lang attribute. A language of an ATSC 3.0 service name is specified in the lang attribute. A language that can be used in an ATSC 3.0 service is specified in the serviceLanguage element. A code relating to a capability is specified in the capabilityCode element.

Information related to a data delivery method is specified in the deliveryMethod element. The deliveryMethod element is an upper element of a broadcastAppService element and a unicastAppService element. The broadcastAppService element is an upper element of a basePattern element, and information related to delivery via broadcasting is specified in the broadcastAppService element. The unicastAppService element is an upper element of the basePattern element, and information related to delivery via communication is specified in the unicastAppService element.

(S-TSID Format)

FIG. 17 is a diagram illustrating an example of an S-TSID metadata format.

An S-TSID element is a root element and is an upper element of the serviceId attribute and the RS element. A service ID is specified in the serviceId attribute.

Information related to ROUTE session is specified in the RS element. The RS element is an upper element of the bsid attribute, an sIpAddr attribute, a dIpAddr attribute, a dport attribute, a PLPID attribute, and an LS element.

A broadcast stream ID is specified in the bsid attribute. A source IP address is specified in the sIpAddr attribute. A destination IP address is specified in the dIpAddr attribute. A destination port number is specified in the dport attribute. A ROUTE session PLP ID is specified in the PLPID attribute.

Information related to LCT session is specified in the LS element. The LS element is an upper element of a tsi attribute, a PLPID attribute, a bw attribute, a startTime attribute, an endTime attribute, an SrcFlow element, and an RprFlow element.

A TSI is specified in the tsi attribute. A PLP ID is specified in the PLPID attribute. A bandwidth is specified in the bw attribute. A start date and time and an end date and time are specified respectively in the startTime attribute and the endTime attribute. Source flow information is specified in the SrcFlow element. It should be noted that the detailed content of this SrcFlow element will be described later with reference to FIG. 18. Repair flow information is specified in the RprFlow element.

(SrcFlow Element Format)

FIG. 18 is a diagram illustrating an example of format of the SrcFlow element included in the S-TSID metadata depicted in FIG. 17.

The SrcFlow element is an upper element of an rt attribute, a minBuffSize attribute, an EFDT element, a ContentInfo element, and a Payload element. A minimum buffer size required for the client apparatus 40 is specified in the minBuffSize attribute.

Information related to an extended FDT is specified in the EFDT element. Information related to content is specified in the ContentInfo element. The ContentInfo element is an upper element of the quotaDomain attribute.

A quota domain identifier of a cache quota domain to which a service including a target LCT session belongs is specified in the quotaDomain attribute. A resource (file) cached in the local memory is shared among services that belong to the same cache quota domain.

The Payload element is an upper element of a codePoint attribute, a formatID attribute, a frag attribute, an order attribute, an srcFecPayloadID attribute, and an FECParams attribute, and information related to a payload of a ROUTE packet contained in a source flow object is specified in the Payload element.

(AST Format)

FIGS. 19 to 21 are diagrams illustrating examples of AST metadata formats.

An ApplicationList element is a root element and is an upper element of the Application element and an ApplicationReference element.

Information related to application is specified in the Application element. The Application element is an upper element of an appName element, an applicationIdentifier element, an applicationDescriptor element, an applicationUsageDescriptor element, an applicationBoundary element, an applicationTransport element, an applicationLocation element, and an applicationSpecificDescriptor element.

The appName element is an upper element of a Language attribute, and an application name is specified in the appName element. The applicationIdentifier element is an upper element of an orgID element and an appID element, and an application ID of an application is specified in the applicationIdentifier element.

The applicationDescriptor element is an upper element of a type element, a controlCode element, a visibility element, a serviceBound element, a priority element, a version element, an icon element, and a storageCapabilities element, and information related to target application property is specified.

The applicationUsageDescriptor element is an upper element of an ApplicationUsage element, and information related to application usage type is specified. Information related to application boundary is specified in the applicationBoundary element. Information related to application transport protocol is specified in the applicationTransport element.

In the case of HTTP transport type, a URLBase element and a URLExtension element are provided, and a URL is specified. An extended URL is specified in the URLExtension element. In addition, in the case of ROUTE transport type, an atsc:ROUTESessionInfo element (including an LCTSession element, a tsi attribute, and a plpID attribute), a broadcastStreamId attribute, a plpID attribute, a sourceIpAddress attribute, a destinationIpAddress attribute, and a destinationPort attribute are provided, and information related to ROUTE session is specified.

Application location information is specified in the applicationLocation element. An application descriptor is provided in the applicationSpecificDescriptor element. As this descriptor, dvbDescriptor corresponding to DVB (Digital Video Broadcasting), htmlDescriptor corresponding to HTML (HyperText Markup Language), atscDescriptor corresponding to ATSC, or otherDescriptor corresponding to other standard is selectively provided.

The atsc:atscDescriptor element is an upper element of a quotaDomain attribute, a size element, a requiredCapabilities element, an icon element, an ApplicationRecordingDescriptor element, a timeSlotInfo element, a contentLinkage element, a contentItem element, and a graphicConstraintsDescriptor, and information related to ATSC (ATSC 3.0) is specified.

A quota domain identifier of a cache quota domain to which a service including a target application belongs is specified in the quotaDomain attribute. A resource (file) cached in the local memory is shared among services that belong to the same cache quota domain.

It should be noted, however, that the icon element includes a filename attribute, a size attribute, and an aspectRatio attribute. Also, the ApplicationRecordingDescriptor element includes a scheduled_recording_flag element, a trick_mode_aware_flag element, a time_shift_flag element, a dynamic_flag element, an av_synced_flag element, an initiating_replay_flag element, and a storage_properties element. Further, a timeSlotInfo element includes a timeslot_type element, a timeslot_start element, a timeslot_length element, an acquisition_time element, and a repeat_period element.

Also, the contentItem element includes a location attribute, a contentLinkage attribute, an updatesAvailable attribute, the size attribute, and the timeSlotInfo element. This timeSlotInfo element includes the timeslot_type element, the timeslot_start element, the timeslot_length element, the acquisition_time element, and the repeat_period element. The graphicConstraintsDescriptor element includes a can_run_without_visible_ui element, a handles_configuration_changed element, a handles_externally_controlled_video element, a graphics_configuration_byte element, and a screenPosition element.

It should be noted that the formats, as described with reference to FIGS. 15 to 21, of SLT metadata, USBD metadata, S-TSID metadata, and AST metadata are merely examples, and formats partially changed, for example, by adding other elements and attributes may be used. Also, SLT metadata, USBD metadata, S-TSID metadata, and AST metadata are not limited to XML format and may be written in other markup language or may be in section format.

Also, a quota domain identifier specified by the quotaDomain attribute added by extending signaling of SLT metadata, USBD metadata, S-TSID metadata, AST metadata, and so on may be included in one kind of metadata or in a plurality of kinds of metadata. Also, in a case where a plurality of services are provided, the quota domain identifier specified by the quotaDomain attribute is written in different kinds of metadata, one kind for each service. Further, although, in each of the metadata format examples described above, an example was described in which a quota domain identifier was specified by the quotaDomain attribute, a quota domain identifier is not necessarily specified by an attribute and may be specified, for example, by an element or information written as text.

<5. Configuration of Each Apparatus>

A description will be given next of configurations of the Ad/DASH server 10, the broadcast server 20, the communication server 30, and the client apparatus 40 on the receiving side in the transport system 1 depicted in FIG. 1 with reference to FIGS. 22 to 25.

(Configuration of Ad/DASH Server)

Figure 22:
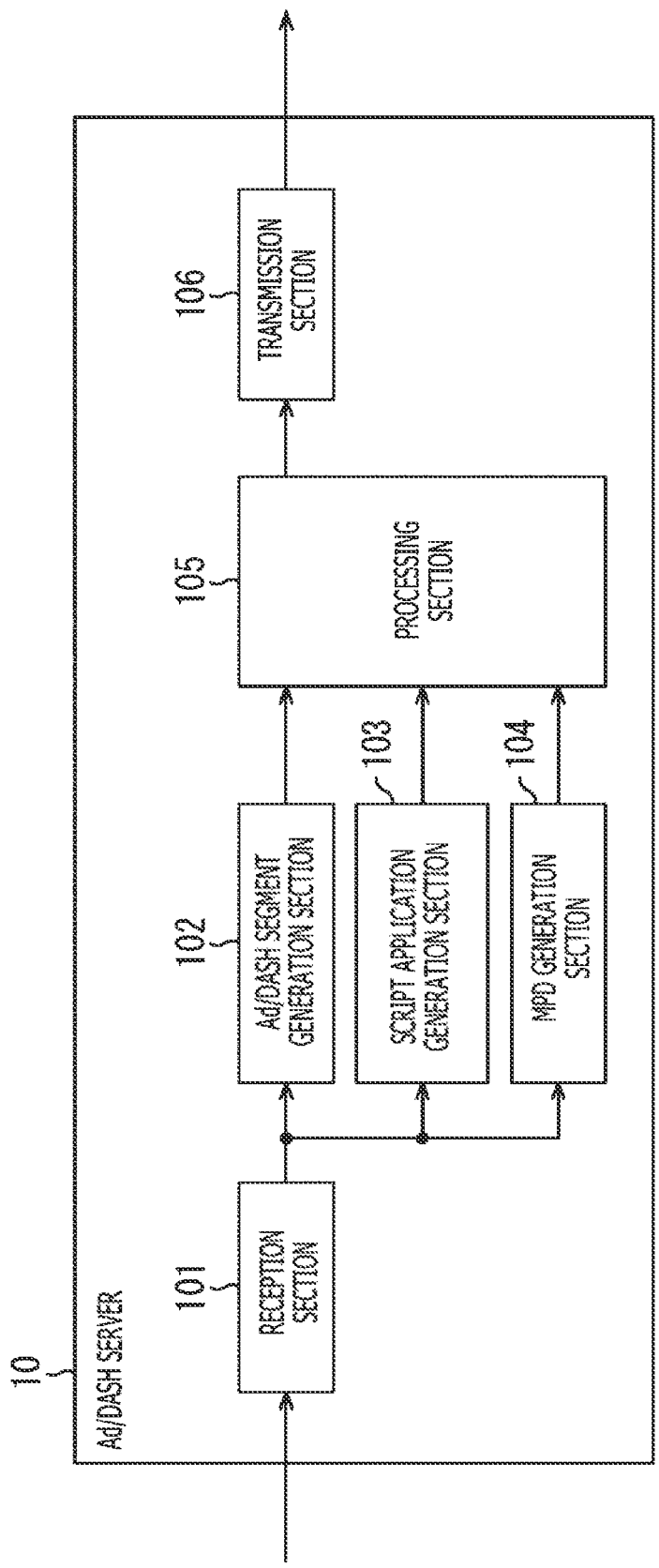
FIG. 22 is a diagram illustrating a configuration example of an Ad/DASH server.

FIG. 22 is a diagram illustrating a configuration example of the Ad/DASH server 10 depicted in FIG. 1.

In FIG. 22, the Ad/DASH server 10 includes a reception section 101, an Ad/DASH segment generation section 102, a script application generation section 103, an MPD generation section 104, a processing section 105, and a transmission section 106.

The reception section 101 receives streaming delivery data, for example, from an external server (not depicted) and supplies data to the Ad/DASH segment generation section 102, the script application generation section 103, and the MPD generation section 104.

The Ad/DASH segment generation section 102 generates an Ad segment and a DASH segment based on data supplied from the reception section 101 and supplies the segments to the processing section 105.

Here, the Ad segment is a segment file acquired by processing advertisement content. Also, the DASH segment is a segment file acquired by processing live content (e.g., live programs such as on-the-spot sports broadcasting) sent via a transport channel or a communication circuit from a broadcasting site or recorded content accumulated in the storage (e.g., prerecorded programs such as dramas). It can be said that an Ad segment is also a kind of DASH segment. However, a description will be given by differentiating between Ad segment and DASH segment for reasons of description.

The script application generation section 103 generates a script application based on the data supplied from the reception section 101 and supplies the data to the processing section 105. Here, the script application is an application that can execute a script. This script application can be an application developed using a markup language such as HTML5 or an application developed using a script language such as JavaScript (registered trademark).

The MPD generation section 104 generates MPD metadata based on the data supplied from the reception section 101 and supplies the MPD metadata to the processing section 105. Here, although the Period element appropriate to content such as program or advertisement is written in MPD metadata, the detailed content thereof will be described later.

The processing section 105 performs necessary processes on the Ad segment and the DASH segment supplied from the Ad/DASH segment generation section 102, the script application supplied from the script application generation section 103, and the MPD metadata supplied from the MPD generation section 104 and supplies the data to the transmission section 106.

The transmission section 106 sends the data supplied from the processing section 105 to the broadcast server 20 or the communication server 30. It should be noted that, here, of the data (files) of the Ad segment and the DASH segment, the script application, and the MPD metadata, data delivered via broadcasting is sent to the broadcast server 20 and data delivered via communication is sent to the communication server 30.

The Ad/DASH server 10 is configured as described above.

(Configuration of Broadcast Server)

Figure 23:
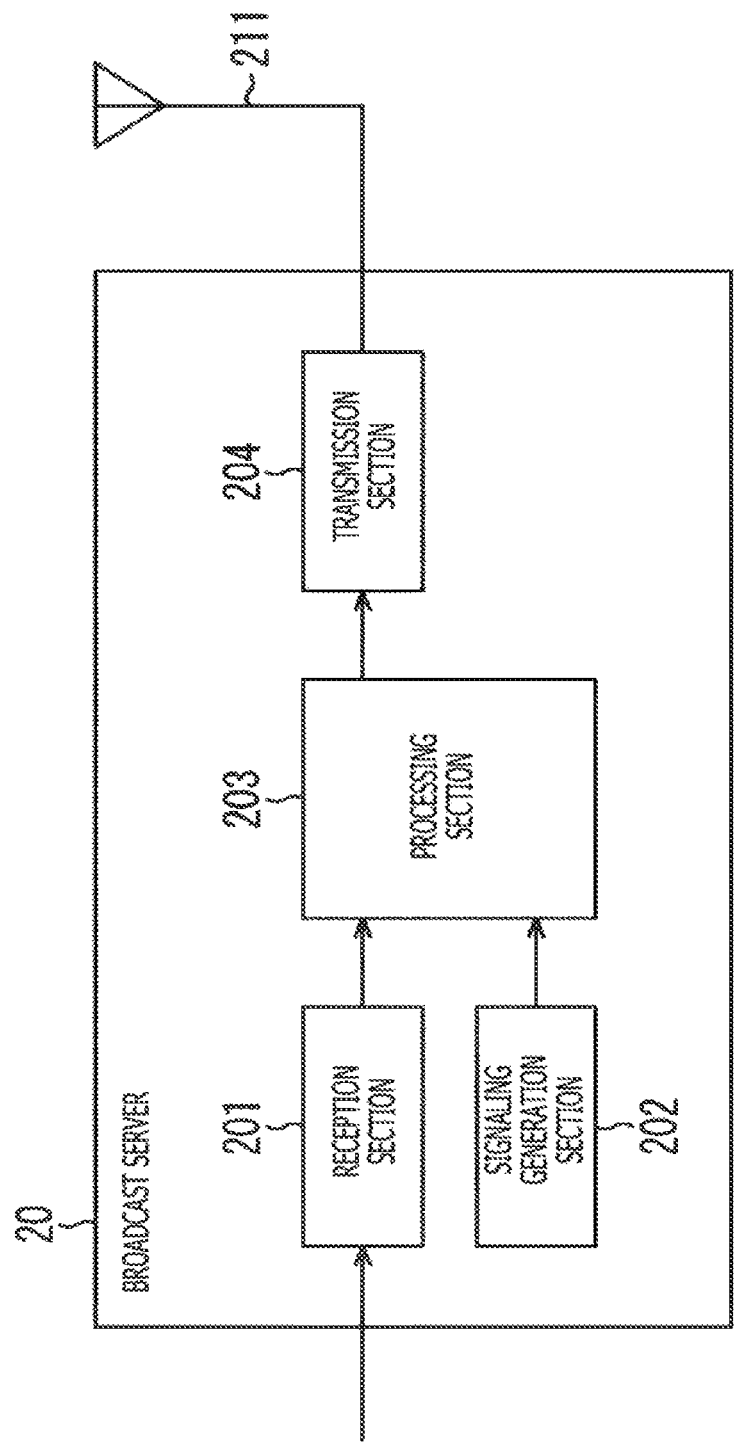
FIG. 23 is a diagram illustrating a configuration example of a broadcast server.

FIG. 23 is a diagram illustrating a configuration example of the broadcast server 20 depicted in FIG. 1.

In FIG. 23, the broadcast server 20 includes a reception section 201, a signaling generation section 202, a processing section 203, and a transmission section 204.

The reception section 201 receives the Ad segment and the DASH segment, the script application, and the MPD metadata, sent from the Ad/DASH server 10 and supplies them to the processing section 203. It should be noted, however, that, here, not all of the Ad segment and the DASH segment, the script application, and the MPD metadata are necessarily provided from the Ad/DASH server 10 and that only data (files) delivered via broadcasting is provided to and received by the reception section 201.

Also, the reception section 201 receives NRT content data (files) from an external server (not depicted) and supplies it to the processing section 203.

The signaling generation section 202 generates signaling and supplies it to the processing section 203. Here, signaling includes LLS signaling such as SLT metadata and SLS signaling such as USBD metadata, S-TSID metadata, and AST metadata. Also, in a case where a resource (file) is shared among a plurality of services, a quota domain identifier of a target cache quota domain is specified in the quotaDomain attribute defined in SLT metadata, USBD metadata, S-TSID metadata, or AST metadata.

The processing section 203 performs necessary processes on the Ad segment and the DASH segment, the script application, the MPD metadata, and the NRT content supplied from the reception section 201 and the signaling supplied from the signaling generation section 202 and supplies the data to the transmission section 204. Here, for example, processes for generating an IP/UDP packet containing, in a payload, LCT session data including the Ad segment and the DASH segment, the script application, the NRT content, and the SLS signaling (e.g., USBD metadata and MPD metadata) and an IP/UDP packet containing LLS signaling (e.g., SLT metadata) data in a payload, are performed.

The transmission section 204 sends (broadcasts) a broadcast wave (digital broadcast signal) for data supplied from the processing section 203 using an antenna 211 via the transport channel 80.

The broadcast server 20 is configured as described above.

(Configuration of Communication Server)

Figure 24:
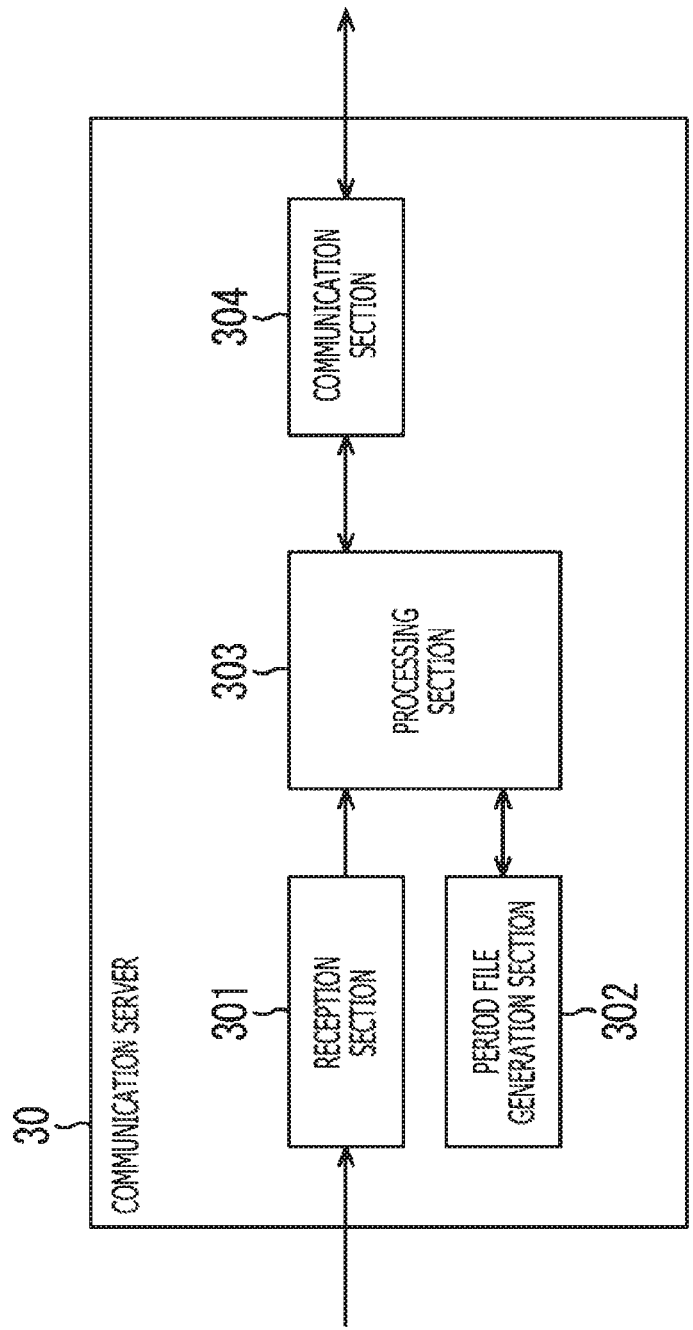
FIG. 24 is a diagram illustrating a configuration example of a communication server.

FIG. 24 is a diagram illustrating a configuration example of the communication server 30 depicted in FIG. 1.

In FIG. 24, the communication server 30 includes a reception section 301, a period file generation section 302, a processing section 303, and a communication section 304.

The reception section 301 receives the Ad segment and the DASH segment, the script application, and the MPD metadata, sent from the Ad/DASH server 10, and supplies them to the processing section 303. It should be noted, however, that, here, not all of the Ad segment and the DASH segment, the script application, and the MPD metadata are necessarily provided from the Ad/DASH server 10 and that only data (files) delivered via communication is provided to and received by the reception section 301.

The processing section 303 processes the data supplied from the reception section 301 in response to a request (XLink resolution request) from the client apparatus 40 received by the communication section 304 and supplies resultant data to the communication section 304. The communication section 304 sends, in response to a request from the client apparatus 40, the data (at least one of the Ad segment and the DASH segment, the script application, and the MPD metadata), supplied from the processing section 303, addressed to the client apparatus 40, the requester of the data, via the Internet 90.

The processing section 303 requests the period file generation section 302 to generate a period file in response to a request from the client apparatus 40 received from the communication section 304. The period file generation section 302 generates a period file including the Period element tailored to the user (user's characteristic) using the client apparatus 40 in response to the request from the processing section 303 and supplies the period file to the processing section 303.

The processing section 303 processes the period file supplied from the period file generation section 302 and supplies the file to the communication section 304. The communication section 304 sends the period file, supplied from the processing section 303, addressed to the client apparatus 40, the requester of the XLink resolution request, via the Internet 90.

The communication server 30 is configured as described above.

(Configuration of Client Apparatus)

Figure 25:
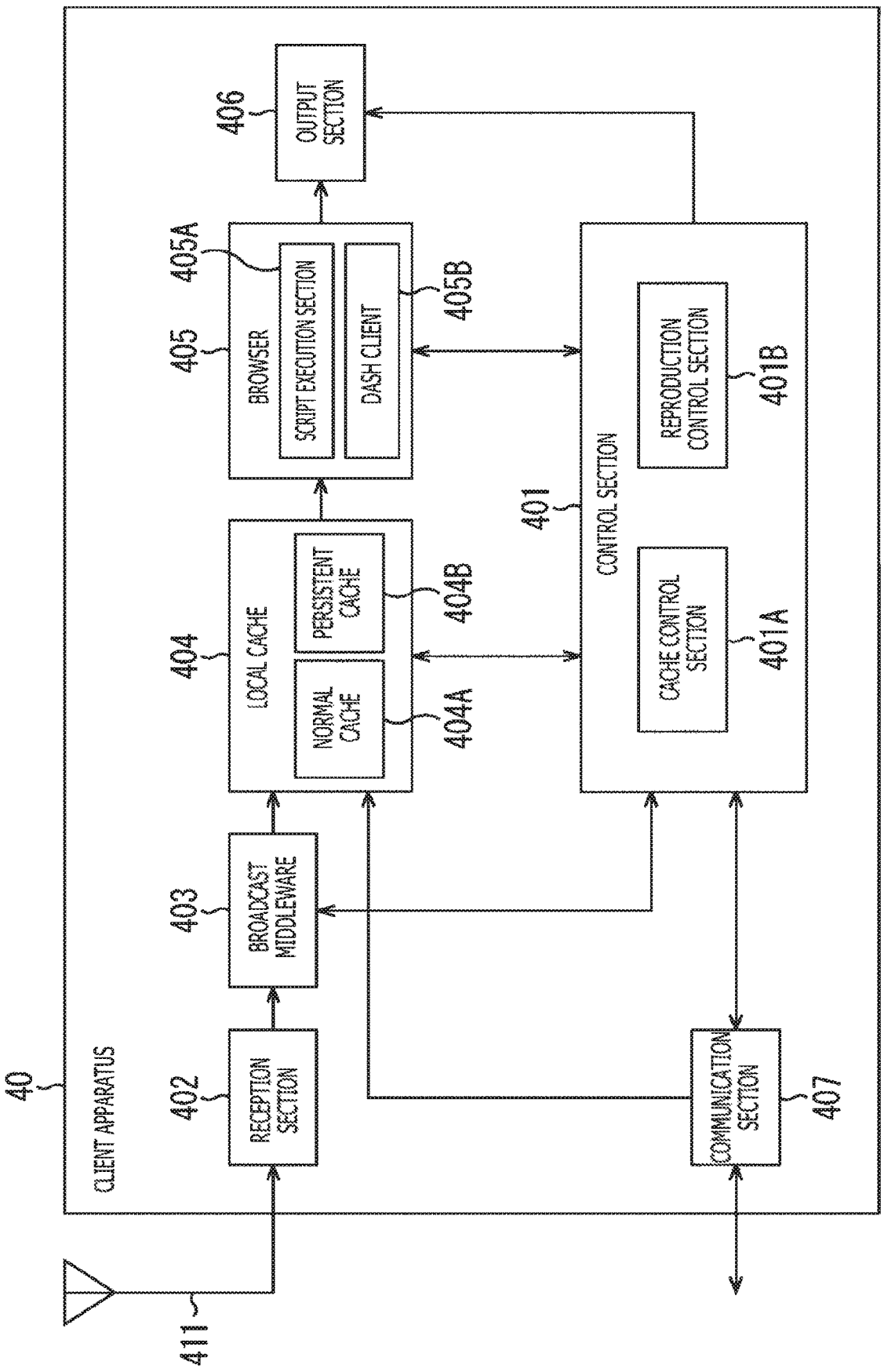
FIG. 25 is a diagram illustrating a configuration example of a client apparatus.

FIG. 25 is a diagram illustrating a configuration example of the client apparatus 40 depicted in FIG. 1.

In FIG. 25, the client apparatus 40 includes a control section 401, a reception section 402, broadcast middleware 403, a local cache 404, a browser 405, an output section 406, and a communication section 407.

The control section 401 controls the operation of the respective sections of the client apparatus 40.

The reception section 402 receives and processes the broadcast wave (digital broadcast signal) sent (broadcast) from the broadcast server 20 using an antenna 411 via the transport channel 80 and supplies the data acquired therefrom to the broadcast middleware 403. It should be noted that the reception section 402 includes, for example, a tuner.

The broadcast middleware 403 processes the data supplied from the reception section 402 and supplies the processed data to the control section 401 and the local cache 404. Here, of the data to be processed, the Ad segment and the DASH segment, the script application, and the MPD metadata are supplied to the local cache 404. Also, the signaling is supplied to the control section 401.

The control section 401 includes a cache control section 401A and a reproduction control section 401B. The cache control section 401A controls the local cache 404 on the basis of signaling supplied from the broadcast middleware 403, a request from the browser 405, and so on. Also, the reproduction control section 401B controls the browser 405 on the basis of signaling supplied from the broadcast middleware 403 and so on.

The local cache 404 is realized on an On Memory, SSD (Solid State Drive), or other local file system, for example.

The local cache 404 caches data (files) supplied from the broadcast middleware 403 under control of the cache control section 401A. Data such as Ad segment and DASH segment, script application, and MPD metadata is cached in the local cache 404. Also, the local cache 404 includes a normal cache 404A and a persistent cache 404B.

Here, the normal cache 404A is a normal cache, and data cached therein is deleted after an appropriate amount of time (a not-so-long time period) elapses. On the other hand, the persistent cache 404B is a special cache, and data cached therein has preferential persistence and remains cached for a longer time period than data cached in the normal cache 404A.

Where a quota domain identifier (of the cache quota domain) is specified in the signaling (quotaDomain attribute defined in the SLT metadata, USBD metadata, S-TSID metadata, or AST metadata included in the signaling) from the broadcast middleware 403, and when a request is made from the browser 405 (script execution section 405A of the browser 405) to pull the target Ad segment and DASH segment and so on into the persistent cache 404B, the cache control section 401A pulls the target Ad segment and DASH segment and so on (the files thereof) into the persistent cache 404B.

As a result, a group of files such as Ad segment and DASH segment cached in the persistent cache 404B are linked by the quota domain identifier. As a result, a file such as Ad segment or DASH segment is shared among a plurality of services that belong to the same cache quota domain.

The browser 405 is a browser that supports HTML5, JavaScript (registered trademark), and so on. The browser 405 processes data (files) read from the local cache 404 under control of the reproduction control section 401B. The browser 405 includes the script execution section 405A and a DASH client 405B.

The script execution section 405A can execute a script written in a script language such as JavaScript (registered trademark). For example, the script execution section 405A can read a script application from the local cache 404 (the normal cache 404A or the persistent cache 404B thereof) and execute the application.

Also, the script execution section 405A causes the cache control section 401A to control the local cache 404 by executing the CacheStorage API (Application Programming Interface) written in the script application. It should be noted that the detailed content of this CacheStorage API will be described later. Further, the script execution section 405A generates a period file that matches user preference and so on in response to an XLink resolution request from the DASH client 405B and sends the file to the DASH client 405B as a response.

The DASH client 405B reads the MPD metadata (file thereof) from the local cache 404 (normal cache 404A thereof) and parses the MPD metadata (analyzes the syntax thereof). In accordance with the result of analyzes of the MPD metadata, the DASH client 405B reads the Ad segment or the DASH segment (file thereof) from the local cache 404 (normal cache 404A or persistent cache 404B thereof) and reproduces the segment.

The data of the Ad segment or the DASH segment reproduced by the DASH client 405B is supplied to the output section 406. The output section 406 outputs the data supplied from the DASH client 405B under control of the reproduction control section 401B. As a result, a broadcast program, an advertisement, or other content is reproduced, and its video and audio are output.

The communication section 407 exchanges data with the communication server 30 via the Internet 90 under control of the control section 401. Of the data received by the communication section 407, the Ad segment and the DASH segment, the script application, and the MPD metadata are supplied to the local cache 404. Also, the signaling is supplied to the control section 401. Processes performed on these pieces of data acquired via communication are similarly to those described above for the data acquired via broadcasting. Therefore, the description thereof is omitted.

The client apparatus 40 is configured as described above.

<6. Flow of Processes Performed by Each Apparatus>

A description will be given next of a flow of processes handled by each apparatus of the transport system 1 depicted in FIG. 1 with reference to the flowcharts depicted in FIGS. 26 to 28.

(Flow of Processes on Transmitting Side)

A description will be given first of a flow of processes on a transmitting side performed by the Ad/DASH server 10, the broadcast server 20, and the communication server 30 with reference to the flowchart depicted in FIG. 26.

Figure 26:
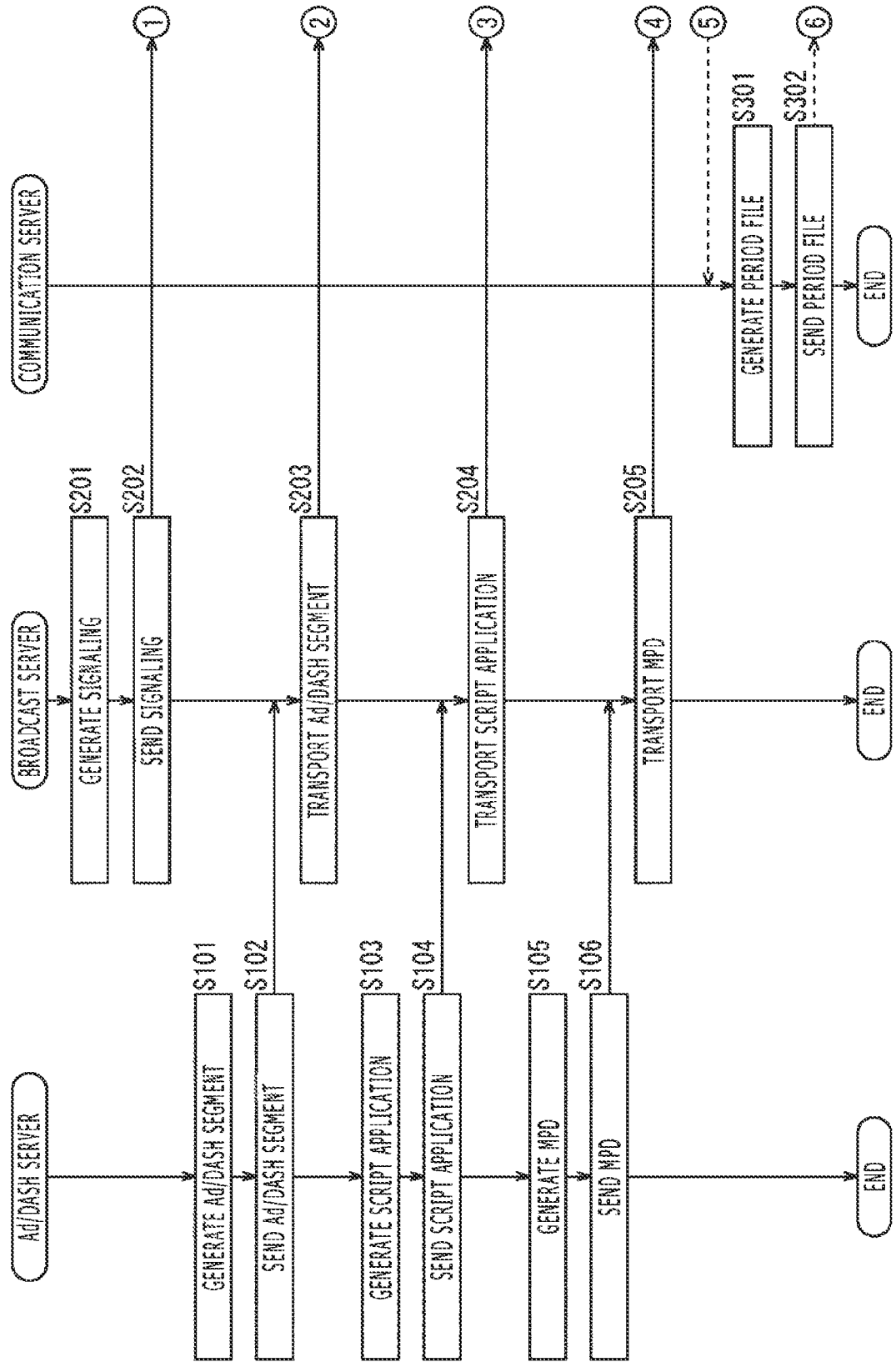
FIG. 26 is a flowchart describing a flow of processes on a transmitting side.

It should be noted that, in FIG. 26, the processes from step S101 to step S106 are performed by the Ad/DASH server 10, the processes from step S201 to step S205 are performed by the broadcast server 20, and the processes in steps S301 and S302 are performed by the communication server 30.

In step S101, the Ad/DASH segment generation section 102 of the Ad/DASH server 10 generates an Ad segment and a DASH segment. Also, in step S102, the transmission section 106 of the Ad/DASH server 10 sends the Ad segment and the DASH segment generated by the process in step S101 to the broadcast server 20.

Here, the Ad segment is a segment file acquired by processing advertisement content. Also, the DASH segment is a segment file acquired by processing broadcast program content. A description will be given here of a case in which an Ad segment and a DASH segment are generated at the same time for reasons of description. However, these segments may be generated at different times.

In step S201, the signaling generation section 202 of the broadcast server 20 generates signaling. In step S202, the transmission section 204 of the broadcast server 20 sends (broadcasts) the signaling generated by the process in step S201 via the transport channel 80.

Here, LLS signaling such as SLT metadata and SLS signaling such as USBD metadata are generated as signaling. Also, in a case where a resource (file) is shared among a plurality of services, a quota domain identifier of a target cache quota domain is specified in the quotaDomain attribute defined in SLT metadata, USBD metadata, S-TSID metadata, or AST metadata.

Also, in the broadcast server 20, the Ad segment and the DASH segment sent by the process in step S202 are received by the reception section 201. Then, in step S203, the transmission section 204 of the broadcast server 20 sends (broadcasts) the Ad segment and the DASH segment generated by the Ad/DASH server 10 via the transport channel 80.

In step S103, the script application generation section 103 of the Ad/DASH server 10 generates a script application. In step S104, the transmission section 106 of the Ad/DASH server 10 sends the script application generated by the process in step S103 to the broadcast server 20.

In the broadcast server 20, the script application sent by the process in step S104 is received by the reception section 201. Then, in step S204, the transmission section 204 of the broadcast server 20 sends (broadcasts) the script application generated by the Ad/DASH server 10 via the transport channel 80.

In step S105, the MPD generation section 104 of the Ad/DASH server 10 generates MPD metadata. In step S106, the transmission section 106 of the Ad/DASH server 10 sends the MPD metadata generated by the process in step S105 to the broadcast server 20.

Here, Period elements of a broadcast program and an advertisement are written in the MPD metadata. In the Period element of the advertisement, for example, the URL "urn:atsc:ad-insertion:abc:1234" is written as the xlink:href attribute. It should be noted, however, "urn:atsc:ad-insertion" in this URL indicates that a request must be made to the script (script application) executed locally (by the client apparatus 40) to resolve ad-insertion control.

That is, according to MPEG-DASH rules, by writing a URL made up of a character string starting with normal "http:" in the xlink:href attribute of the Period element in MPD metadata, the client apparatus 40 inquires the communication server 30 on the Internet 90 specified by this "http: . . . ." Then, the client apparatus 40 receives a period file as a response from the communication server 30 and reproduces advertisement content (Ad segment) on the basis of the content of the Period element included in the period file.

In this example, on the other hand, a URN (Uniform Resource Name) made up of a character string starting with "urn:atsc:ad-insertion" is written in the xlink:href attribute of the Period element of MPD metadata rather than a URL made up of a character string starting with "http:." As a result, in a case where the Period element having the xlink:href attribute with a character string starting with "urn:atsc:ad-insertion" specified therein is detected in the client apparatus 40 during parsing (analyzing the syntax) of MPD metadata, an event rather than an HTTP request is issued to the script application that is executed at the same time to prompt XLink resolution (Period element resolution).

It should be noted that although a case will be mainly described in this example in which a URN made up of a character string starting with "urn:atsc:ad-insertion" is specified in the xlink:href attribute of the Period element in MPD metadata, a URL such as "http://adservice.com/adp-1?user=$groupID$" is specified as described above so that a specific user is specified by a groupID.

In the broadcast server 20, the MPD metadata sent by the process in step S106 is received by the reception section 201. Then, in step S205, the transmission section 204 of the broadcast server 20 sends (broadcasts) the MPD metadata generated by the Ad/DASH server 10 via the transport channel 80.

It should be noted that, for reasons of description, in step S202 to step S205, a description was given assuming that signaling, an Ad segment and a DASH segment, a script application, and MPD metadata are sent at different times, these pieces of data are sent included in a broadcast stream.

In the communication server 30, an XLink resolution request sent from the client apparatus 40 via the Internet 90 is received by the communication section 304. Then, in step S301, the period file generation section 302 of the communication server 30 generates a period file. In step S302, the communication section 304 of the communication server 30 sends the period file generated by the process in step S301 addressed to the client apparatus 40, the sender of the XLink resolution request, via the Internet 90.

It should be noted that an XLink resolution request is sent from the client apparatus 40 to the communication server 30 as described above where a URL made up of a character string starting with "http:" is written in the xlink:href attribute of the Period element in MPD metadata.

Hitherto, a description has been given of the flow of processes on the transmitting side.

(Flow of Processes on Receiving Side)

A description will be given next of a flow of processes performed by the client apparatus 40 on the receiving side with reference to the flowcharts depicted in FIGS. 27 and 28.

Figure 27:
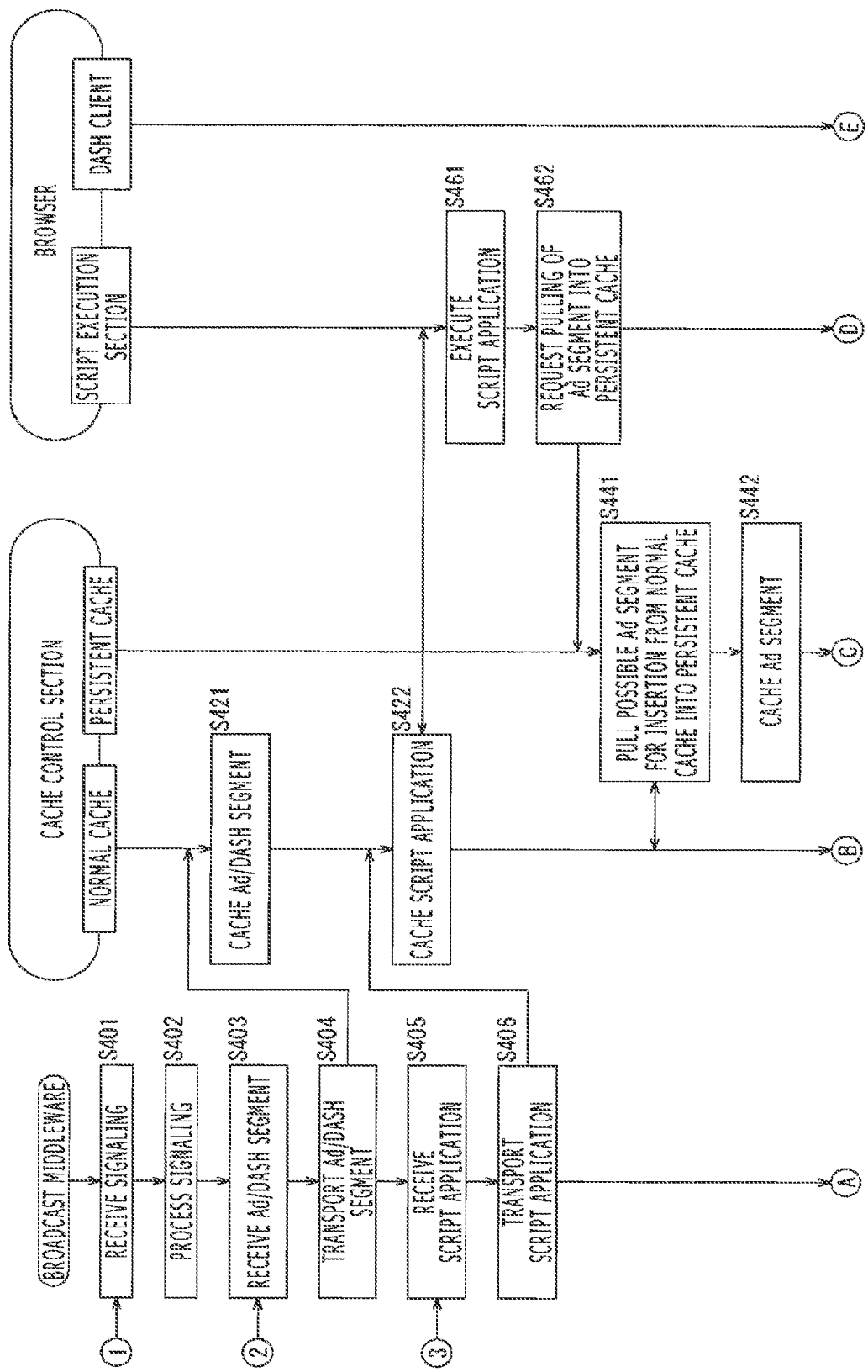
FIG. 27 is a flowchart describing a flow of processes on the receiving side.
Figure 28:
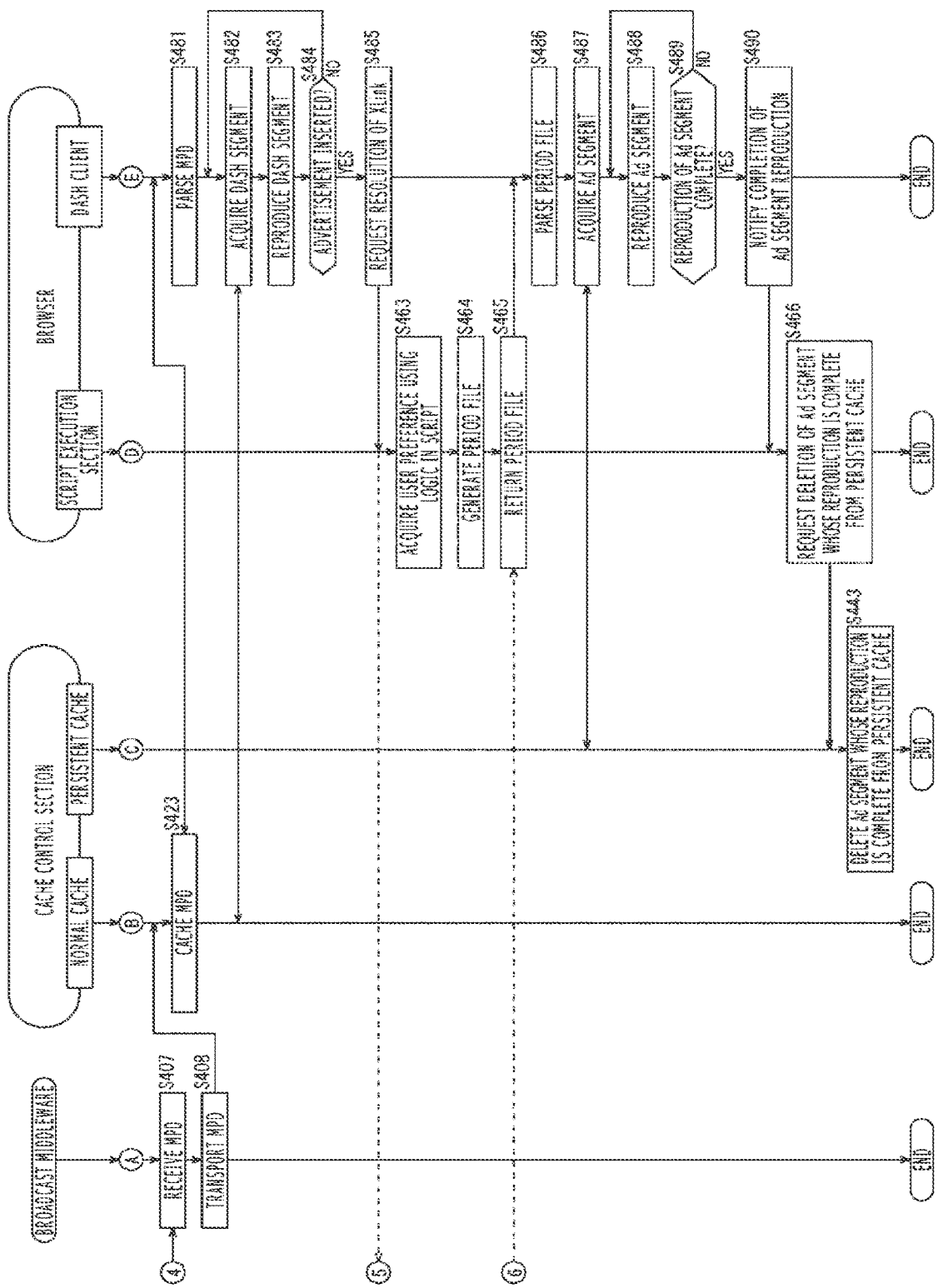
FIG. 28 is a flowchart describing a flow of processes on the receiving side.

It should be noted that, in FIGS. 27 and 28, the processes from step S401 to step S408 are performed by the broadcast middleware 403 and the processes from step S421 to step S423 and the processes from step S441 to step S443 are performed by the cache control section 401A that controls the local cache 404 (normal cache 404A or persistent cache 404B). Also, the processes from step S461 to step S466 are performed by the script execution section 405A of the browser 405, and the processes from step S481 to step S490 are performed by the DASH client 405B of the browser 405.

In step S401, the broadcast middleware 403 receives, via the reception section 402, signaling sent from the broadcast server 20 via the transport channel 80. In step S402, the broadcast middleware 403 processes the signaling received by the process in step S401.

Here, LLS signaling such as SLT metadata and SLS signaling such as USBD metadata are processed as signaling. Also, in a case where a resource (file) is shared among a plurality of services, a quota domain identifier of a target cache quota domain is specified in the quotaDomain attribute defined in SLT metadata, USBD metadata, S-TSID metadata, or AST metadata, thereby allowing the services that belong to this cache quota domain to be recognized.

In step S403, the broadcast middleware 403 receives, via the reception section 402, an Ad segment and a DASH segment sent from the broadcast server 20 via the transport channel 80. In step S404, the broadcast middleware 403 transports the Ad segment and the DASH segment, received by the process in step S403, to the local cache 404.

In step S421, the cache control section 401A caches the Ad segment and the DASH segment (files thereof), transported by the process in step S404, in the normal cache 404A of the local cache 404.

In this case, the Ad segment and the DASH segment (files thereof) are cached in the normal cache 404A. Therefore, if this condition continues, these segments are deleted after an appropriate amount of time (a not-so-long time period) elapses. Also, although a case is described here in which the Ad segment and the DASH segment (files thereof) are cached at the same time for reasons of description, these segments (files thereof) may be cached at different times.

In step S405, the broadcast middleware 403 receives, via the reception section 402, a script application sent from the broadcast server 20 via the transport channel 80. In step S406, the broadcast middleware 403 transports the script application, received by the process in step S405, to the local cache 404.

In step S422, the cache control section 401A caches the script application, transported by the process in step S406, in the normal cache 404A of the local cache 404. In this case, the script application is cached in the normal cache 404A. Therefore, if this condition continues, the script application is deleted after an appropriate amount of time (a not-so-long time period) elapses.

In step S461, the script execution section 405A acquires the script application, cached in the normal cache 404A by the process in step S422, from the local cache 404 and executes the script application.

In step S462, the script execution section 405A requests the cache control section 401A to pull the Ad segment into the persistent cache 404B in response to the execution of the script application (process in step S461).

Here, the instruction to pull the Ad segment into the persistent cache 404B takes place, for example, as the following CacheStorage API, written in the script application, is executed:

```
Interface Cache {
    Promise<void> fetchPeriod(xmlElement);
}
```

It should be noted, however, that, in the above API, the fetchPeriod method is used to instruct that pulling into the persistent cache 404B take place. Also, the segment file (Ad segment file) specified by the segment URL written in the Period element specified by xmlElement, the argument of the fetchPeriod method, is the file stored in the persistent cache 404B.

Also, the following CacheStorage API may be written in the script application:

```
Interface Cache {
    Promise<void> fetchFile(url);
}
```

It should be noted, however, that, in the above API, the fetchFile method is used to instruct that pulling into the persistent cache 404B take place. Also, the segment file (Ad segment file) specified by the url, the argument of the fetchFile method, is the file stored in the persistent cache 404B.

In step S441, the cache control section 401A pulls the Ad segment (file thereof), a potential insertion segment, from the normal cache 404A of the local cache 404 into the persistent cache 404B in response to the pull request made by the process in step S462. As a result, the Ad segment (file thereof), pulled from the normal cache 404A, is cached in the persistent cache 404B of the local cache 404 (S442).

That is, a group of files delivered by way of broadcasting via the transport channel 80 are loaded into the normal cache 404A (HTTP proxy cache (file system)) of the local cache 404 after the ROUTE protocol is terminated by the broadcast middleware 403 and deleted after an appropriate amount of time (a not-so-long time period) elapses. Here, for example, the files are deleted after the amount of time determined by a cache expiration time written in an HTTP header added at the time of file transport in ROUTE entity mode and so on.

On the other hand, the persistent cache 404B of the local cache 404 is a cache treated as a special area of the HTTP proxy cache. That is, a group of files loaded into the persistent cache 404B have more preferential persistence than a group of other files cached in the normal cache 404A. Further, the files are not deleted even after the above "appropriate amount of time" elapses and remain cached until the quota allocated to the local cache 404 is reached.

Then, services to which the group of files cached in the persistent cache 404B belong are linked by the quota domain identifier specified by the quotaDomain attribute defined in SLT metadata, USED metadata, S-TSID metadata, or AST metadata. As a result, a specific file (Ad segment file in this example) is shared among a plurality of services that belong to the same cache quota domain.

In step S407, the broadcast middleware 403 receives, via the reception section 402, MPD metadata sent from the broadcast server 20 via the transport channel 80. In step S408, the broadcast middleware 403 transports the MPD metadata, received by the process in step S407, to the local cache 404.

In step S423, the cache control section 401A caches the MPD metadata, transported by the process in step S408, in the normal cache 404A of the local cache 404. In this case, the MPD metadata is cached in the normal cache 404A. Therefore, the MPD metadata is deleted after an appropriate amount of time (a not-so-long time period) elapses.

In step S481, the DASH client 405B acquires the MPD metadata, cached in the normal cache 404A by the process in step S423, from the local cache 404 and parses the MPD metadata (analyzes the syntax thereof).

In step S482, the DASH client 405B acquires, from the local cache 404, the DASH segment acquired in response to the result of the process in step S402 or S481 (processing result of SLT, USBD, S-TSID, MPD, or other metadata) and cached in the normal cache 404A. In step S483, the DASH client 405B reproduces the DASH segment acquired by the process in step S482 under control of the reproduction control section 401B. As a result, the broadcast program content is reproduced in the client apparatus 40.

In step S484, the DASH client 405B determines whether to insert an advertisement. Where it is determined in step S484 that an advertisement is not inserted, the process returns to step S482, and the processes from step S482 to step S484 are repeated. In this case, the reproduction of the broadcast program content continues. On the other hand, where it is determined that an advertisement is inserted in step S484, the process proceeds to step S485.

In step S485, the DASH client 405B requests the script execution section 405A to resolve XLink included in the MPD metadata in response to the result of the process in step S481.

It should be noted, however, that where a URN made up of a character string starting with "urn:atsc:ad-insertion" is detected from the URL specified by the xlink:href attribute of the Period element of the MPD metadata by the process in step S481, an event is issued to the script application that is executed by the script execution section 405A at the same time to prompt XLink resolution (Period element resolution).

In step S463, the script execution section 405A acquires a user preference using a logic in the script of the script application being executed in response to the XLink resolution request made by the process in step S485. Then, in step S464, the script execution section 405A generates a period file on the basis of the user preference acquired by the process in step S463.

Here, the script execution section 405A generates a period file that includes the Period element to be inserted into MPD metadata on the basis of the URL (e.g., URL such as "urn:atsc:ad-insertion:abc:1234") notified by an event from the DASH client 405B. It should be noted that PDI (Preference Demographic and Interest), for example, may be used as a user preference. This PDI is a mechanism that ensures reproduction (accumulation) of only content that matches user's preferences by generating information indicating the user's answer to the question provided by a specific server.

In step S465, the script execution section 405A sends the period file, generated by the process in step S464, to the DASH client 405B as a response.

It should be noted that where a URL made up of a character string starting with "http:" (e.g., URL such as "http://adservice.com/adp-1?user=$groupID$") is written in the xlink:href attribute of the Period element in MPD metadata, an XLink resolution request is sent to the communication server 30 via the Internet 90 as depicted by a dotted line in the figure (dotted line "5"). Then, the period file appropriate to the XLink resolution request sent from the communication server 30 is acquired as depicted by a dotted line in the figure (dotted line "6").

In step S486, the DASH client 405B acquires the period file sent as a response by the process in step S465 and parses the period file (analyzes the syntax thereof).

In step S487, the DASH client 405B acquires the Ad segment cached in the persistent cache 404B of the local cache 404 in response to the result of the process in step S486. Here, the URL of the target Ad segment is acquired by the process in step S486 as a result of parsing of the Period element, and the Ad segment in the persistent cache 404B is acquired in accordance with the URL. Then, the file of this Ad segment is a file shared among a plurality of services that belong to the same cache quota domain. Therefore, the Ad segment file can be reused.

In step S488, the DASH client 405B reproduces the Ad segment, acquired by the process in step S487, under control of the reproduction control section 401B. As a result, in the client apparatus 40, content to be reproduced is switched from a broadcast program to an advertisement (advertisement is inserted).

In step S489, the DASH client 405B determines whether the reproduction of the Ad segment (process in step S488) is complete. Where it is determined in step S489 that the Ad segment reproduction has yet to be complete, the process returns to step S488, and the Ad segment reproduction continues.

On the other hand, where it is determined in step S489 that the Ad segment reproduction is complete, the process proceeds to step S490. In step S490, the DASH client 405B notifies the script execution section 405A that the Ad segment reproduction is complete.

In step S466, the script execution section 405A requests the cache control section 401A to delete the Ad segment whose reproduction is complete from the persistent cache 404B using the script application being executed in response to the notification regarding the completion of the Ad segment reproduction made in step S490.

Here, an instruction to delete the Ad segment from the persistent cache 404B is made, for example, by executing the following CacheStorage API written in the script application:

```
Interface Cache {
  Promise<void> deleteFile(url);
}
```

It should be noted, however, that, in the above API, the deleteFile method is used to instruct that deletion from the persistent cache 404B take place. Also, the segment file (Ad segment file) specified by the url, the argument of the deleteFile method, is the file deleted from the persistent cache 404B.

In step S443, the cache control section 401A deletes the Ad segment (file thereof) whose reproduction is complete from the persistent cache 404B of the local cache 404 in response to the deletion request made by the process in step S466. It should be noted that, in the client apparatus 40, content to be reproduced is switched from an advertisement to a broadcast program when the Ad segment reproduction ends.

Hitherto, a description has been given of the flow of processes on the receiving side.

<7. Modification Example>

Although, in the above description, ATSC (ATSC 3.0 in particular), a scheme employed, for example, in the United States, was described as a digital broadcasting standard, the present technology may be applied to ISDB (Integrated Services Digital Broadcasting), a scheme adopted, for example, in Japan and DVB (Digital Video Broadcasting), a scheme adopted in European nations, and so on. Also, although, a description was given in the above description by citing ATSC 3.0 that adopts the IP transport scheme as an example, the transport scheme to which the present technology is applied is not limited to the IP transport scheme, and the present technology may be applied to other scheme such as MPEG2-TS (Transport Stream).

Also, the present technology is applicable, among digital broadcasting, not only to terrestrial broadcasting and satellite broadcasting such as broadcasting satellite (BS) and communications satellite (CS) but also to wired broadcasting such as cable television (CATV).

Also, the domain and signaling names described above are merely examples, and there are cases in which other names may be used. It should be noted, however, that these differences in name are differences in formality and that there is no difference in substantial content of a target domain or signaling. For example, cache quota domain may be called by other name such as cache quota group having a similar nuance. Also, for example, AST (Application Signaling Table) may be referred to as AIT (Application Information Table) and so on, and NRT (Non Real Time) may be referred to as LCC (Locally Cached Content). Further, in a case where signaling is written in a markup language such as XML, the names of the elements and attributes thereof are merely examples, and other names may be used. It should be noted, however, that these differences in name are differences in formality and that there is no difference in substantial content of the elements and attributes thereof.

Also, although, in the above description, SLT metadata was described as LLS signaling, metadata such as EAT (Emergency Alerting Table) and RRT (Region Rating Table) may be included in LLS signaling. EAT metadata includes information related to emergency information that must be announced urgently. RRT metadata includes information related to rating.

It should be noted that applications are not limited to those developed using a markup language such as HTML5 or a script language such as JavaScript (registered trademark) and may be applications developed using a programming language such as Java (registered trademark). Also, any content such as electronic book, game, and music in addition to video and advertisement may be included in the content described above.

Also, the present technology is applicable to a given standard (standard other than broadcasting standard) specified on the premise that transport channels other than broadcasting network, i.e., communication lines (communication networks) such as the Internet and telephone network, are used as transport channels.

<8. Configuration of Computer>

Figure 29:
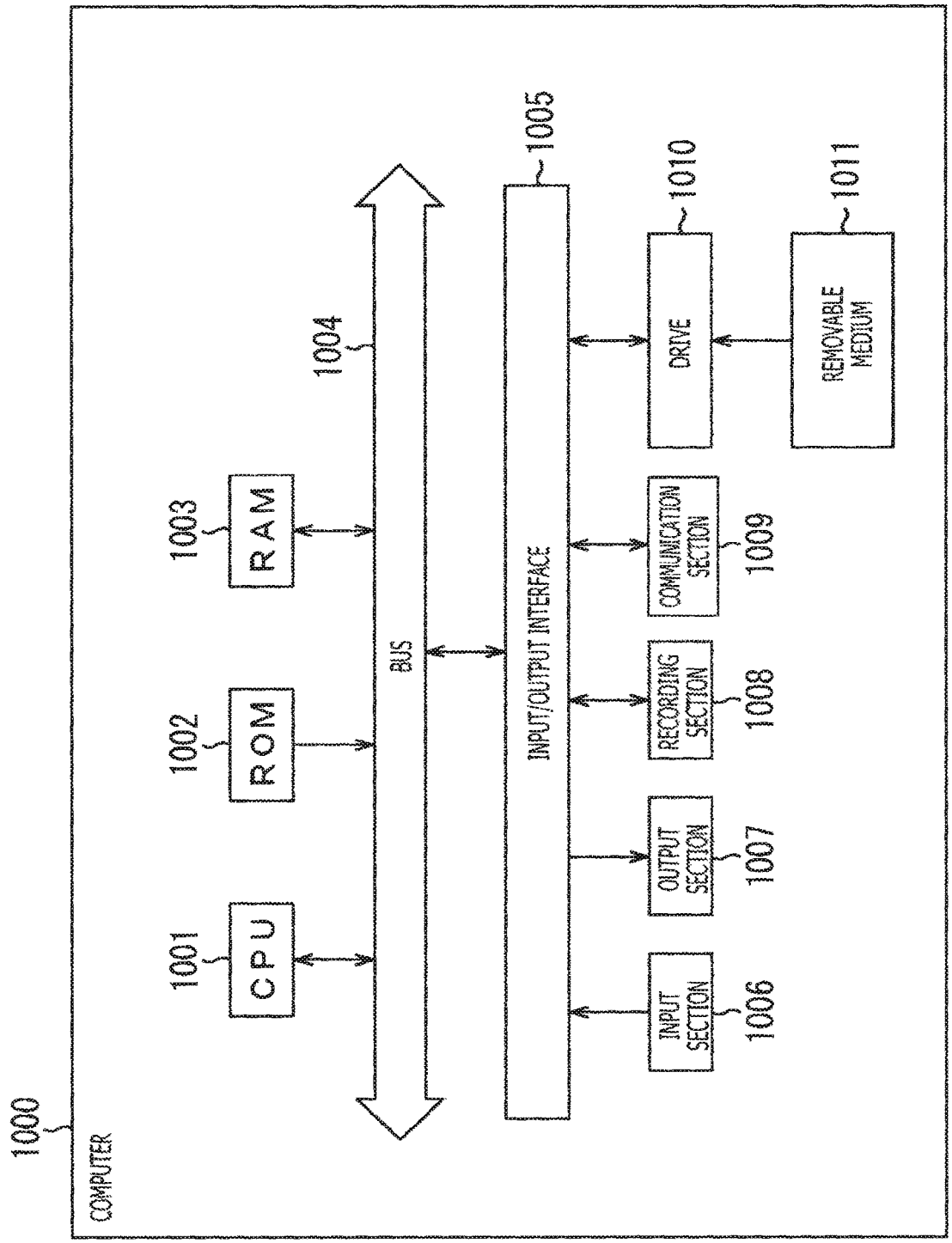
FIG. 29 is a diagram illustrating a configuration example of a computer.

The series of processes described above may be performed by hardware or software. In a case where the series of processes are performed by software, the program making up the software is installed to a computer. FIG. 29 is a diagram illustrating a hardware configuration example of a computer for performing the above series of processes using the program.

In a computer 1000, a CPU (Central Processing Unit) 1001, a ROM (Read Only Memory) 1002, and a RAM (Random Access Memory) 1003 are connected to each other by a bus 1004. An input/output (I/O) interface 1005 is further connected to the bus 1004. An input section 1006, an output section 1007, a recording section 1008, a communication section 1009, and a drive 1010 are connected to the I/O interface 1005.

The input section 1006 includes a keyboard, a mouse, a microphone, and so on. The output section 1007 includes a display, a speaker, and so on. The recording section 1008 includes a hard disk, a non-volatile memory, and so on. The communication section 1009 includes a network interface and so on. The drive 1010 drives a removable medium 1011 such as magnetic disk, optical disc, magneto-optical disk, or semiconductor memory.

In the computer 1000 configured as described above, the above series of processes are performed as the CPU 1001 loads, for example, the program recorded in the ROM 1002 or the recording section 1008 into the RAM 1003 via the I/O interface 1005 and the bus 1004 for execution.

The program executed by the computer 1000 (CPU 1001) can be provided recorded, for example, in the removable medium 1011 as a packaged medium or the like. Alternatively, the program can be provided via a wired or wireless transport medium such as local area network, the Internet, and digital satellite broadcasting.

In computer 1000, the program can be installed to the recording section 1008 via the I/O interface 1005 as the removable medium 1011 is inserted into the drive 1010. Alternatively, the program can be received by the communication section 1009 via a wired or wireless transport medium and installed to the recording section 1008. In addition to the above, the program can be installed, in advance, to the ROM 1002 or the recording section 1008.

Here, in the present specification, the processes performed by the computer in accordance with the program need not necessarily be performed chronologically in accordance with the sequence described as a flowchart. That is, the processes performed by the computer in accordance with the program include those that are performed in parallel or individually (e.g., parallel processes or object-based processes). Also, the program may be processed by a single computer (processor) or by a plurality of computers in a distributed manner.

It should be noted that embodiments of the present technology are not limited to those described above and can be modified in various ways without departing from the gist of the present technology.

It should be noted that the present technology can have the following configurations:

(1)

A reception apparatus including:

a reception section adapted to receive content; and a control section adapted to control, on the basis of control information that is transported together with the content and that includes resource sharing information indicating whether a resource of the content is shared among a plurality of services, storage of the resource in a storage apparatus such that the resource is shared among the plurality of services.

(2)

The reception apparatus of feature (1), in which in a case where the resource sharing information included in the control information indicates that a resource is shared among a plurality of services, the control section stores a shared resource that is shared in a manner that distinguishes the shared resource from other resources.

(3)

The reception apparatus of feature (1) or (2), in which the content and the control information are transported by a broadcast wave, the services are digital broadcasting services, and the control information is signaling for providing the services.

(4)

The reception apparatus of feature (3), in which the signaling is first signaling that permits specification of an attribute for a plurality of services, and the first signaling includes the resource sharing information specified on a service-by-service basis.

(5)

The reception apparatus of feature (3), in which the signaling is second signaling that permits specification of an attribute for each service, and the second signaling includes the resource sharing information specified in given units within a target service.

(6)

The reception apparatus of feature (5), in which the resource sharing information is specified on a service-by-service, on a session-by-session, or on an application-by-application basis.

(7)

The reception apparatus of any one of features (2) to (6), in which the content resource is a file in given format, and the control section stores a shared resource file in a second storage area different from a first storage area where other resource files are stored in response to operation of an application transported together with the content.

(8)

The reception apparatus of feature (7), in which the control section deletes the shared resource file, stored in the second storage area, in response to operation of the application.

(9)

The reception apparatus of any one of features (3) to (8), in which the broadcast wave is a broadcast wave compliant with an IP (Internet Protocol) transport scheme, and data of the content resource file is placed into an IP packet that includes a UDP (User Datagram Protocol) packet and transported.

(10)

The reception apparatus of any one of features (1) to (9), in which the content includes advertisement content, and the resource sharing information is identification information for identifying a group to which a plurality of services sharing a resource of the advertisement content belong.

(11)

A data processing method of a reception apparatus, the data processing method including:

a step in which the reception apparatus receives content and controls, on the basis of control information that is transported together with the content and that includes resource sharing information indicating whether a resource of the content is shared among a plurality of services, storage of the resource in a storage apparatus such that the resource is shared among the plurality of services.

(12)

A transmission apparatus including:

a generation section adapted to generate control information that includes resource sharing information indicating whether a resource of content is shared among a plurality of services; and a transmission section adapted to send the control information together with the content.

(13)

The transmission apparatus of feature (12), in which the content and the control information are transported by a broadcast wave, the services are digital broadcasting services, and the control information is signaling for providing the services.

(14)

The transmission apparatus of feature (13), in which the signaling is first signaling that permits specification of an attribute for a plurality of services, and the first signaling includes the resource sharing information specified on a service-by-service basis.

(15)

The transmission apparatus of feature (13), in which the signaling is second signaling that permits specification of an attribute for each service, and the second signaling includes the resource sharing information specified in given units within a target service.

(16)

The transmission apparatus of feature (15), in which the resource sharing information is specified on a service-by-service, on a session-by-session, or on an application-by-application basis.

(17)

The transmission apparatus of any one of features (12) to (16), in which the content resource is a file in given format.

(18)

The transmission apparatus of any one of features (13) to (17), in which the broadcast wave is a broadcast wave compliant with an IP transport scheme, and data of the content resource file is placed into an IP packet that includes a UDP packet and transported.

(19)

The transmission apparatus of any one of features (12) to (18), in which the content includes advertisement content, and the resource sharing information is identification information for identifying a group to which a plurality of services sharing a resource of the advertisement content belong.

(20)

A data processing method of a transmission apparatus, the data processing method including:

a step in which the transmission apparatus generates control information that includes resource sharing information indicating whether a resource of content is shared among a plurality of services and sends the control information together with the content.

REFERENCE SIGNS LIST

1 Transport system, 10 Ad/DASH server, 20 Broadcast server, 30 Communication server, 40 Client apparatus, 80 Transport channel, 90 Internet, 101 Reception section, 102 Ad/DASH segment generation section, 103 Script application generation section, 104 MPD generation section, 105 Processing section, 106 Transmission section, 201 Reception section, 202 Signaling generation section, 203 Processing section, 204 Transmission section, 301 Reception section, 302 Period file generation section, 303 Processing section, 304 Communication section, 401 Control section, 401A Cache control section, 401B Reproduction control section, 402 Reception section, 403 Broadcast middleware, 404 Local cache, 404A Normal cache, 404B Persistent cache, 405 Browser, 405A Script execution section, 405B DASH client, 406 Output section, 407 Communication section, 1000 Computer, 1001 CPU

The invention claimed is:

1. A reception apparatus comprising:

reception circuitry configured to receive control information and content; and processing circuitry configured to control, based on the control information that includes resource sharing information indicating whether a resource of the content is shared among a plurality of services, storage of the resource such that the resource is shared among the plurality of services, wherein the resource is stored in association with a shared identifier indicated by the resource sharing information, the shared identifier is associated with the plurality of services among which the resource is shared, and at least one of the content includes advertisement content or the resource of the content includes at least one file of a broadcaster application, the resource sharing information being identification information for identifying a group to which the plurality of services sharing the resource of the advertisement content belongs in a case that the content includes the advertisement content.

2. The reception apparatus of claim 1, wherein in a case where the resource sharing information included in the control information indicates that the resource is shared among the plurality of services, the processing circuitry stores the resource in association with a domain identifier indicated by the resource sharing information.

3. The reception apparatus of claim 2, wherein the content and the control information is included in a broadcast signal, the services are digital broadcasting services, and the control information is signaling for providing the services.

4. The reception apparatus of claim 3, wherein the signaling is first signaling that permits specification of an attribute for the plurality of services, and the first signaling includes the resource sharing information specified on a service-by-service basis.

5. The reception apparatus of claim 3, wherein the signaling is second signaling that permits specification of an attribute for each service, and the second signaling includes the resource sharing information specified in given units within a target service.

6. The reception apparatus of claim 5, wherein the resource sharing information is specified on a service-by-service, on a session-by-session, or on an application-by-application basis.

7. The reception apparatus of claim 3, wherein the content resource is a shared resource file in a given format, and the processing circuitry stores the shared resource file in a second storage area different from a first storage area where other resource files are stored in response to operation of an application transported together with the content.

8. The reception apparatus of claim 7, wherein the processing circuitry deletes the shared resource file, stored in the second storage area, in response to operation of the application.

9. The reception apparatus of claim 3, wherein the broadcast signal is compliant with an IP (Internet Protocol) transport scheme, and data of a file of the content resource is placed into an IP packet that includes a UDP (User Datagram Protocol) packet and transported.

10. The reception apparatus of claim 1, wherein the content includes the advertisement content, and the resource sharing information is the identification information for identifying the group to which the plurality of services sharing the resource of the advertisement content belongs.

11. A data processing method of a reception apparatus, the data processing method comprising:

receiving control information and content; and controlling, by processing circuitry and based on the control information that includes resource sharing information indicating whether a resource of the content is shared among a plurality of services, storage of the resource such that the resource is shared among the plurality of services, wherein the resource is stored in association with a shared identifier indicated by the resource sharing information, the shared identifier is associated with the plurality of services among which the resource is shared, and the content includes advertisement content or the resource of the content includes at least one file of a broadcaster application, the resource sharing information being identification information for identifying a group to which the plurality of services sharing the resource of the advertisement content belongs in a case that the content includes the advertisement content.

12. A transmission apparatus comprising:

processing circuitry configured to generate control information that includes resource sharing information indicating whether a resource of content is shared among a plurality of services, the control information indicating a shared identifier that is associated with the shared resource when stored at a reception apparatus; and transmission circuitry configured to send the control information and the content,
wherein the shared identifier is associated with the plurality of services among which a is shared, and
at least one of the content includes advertisement content or the resource of the content includes at least one file of a broadcaster application, the resource sharing information being identification information for identifying a group to which the plurality of services sharing the resource of the advertisement content belongs in a case that the content includes the advertisement content.

13. The transmission apparatus of claim 12, wherein
the content and the control information are transported by a broadcast signal,
the services are digital broadcasting services, and
the control information is signaling for providing the services.

14. The transmission apparatus of claim 13, wherein
the signaling is first signaling that permits specification of an attribute for the plurality of services, and
the first signaling includes the resource sharing information specified on a service-by-service basis.

15. The transmission apparatus of claim 13, wherein
the signaling is second signaling that permits specification of an attribute for each service, and
the second signaling includes the resource sharing information specified in given units within a target service.

16. The transmission apparatus of claim 15, wherein
the resource sharing information is specified on a service-by-service, on a session-by-session, or on an application-by-application basis.

17. The transmission apparatus of claim 12, wherein
the content resource is a file in a given format.

18. The transmission apparatus of claim 17, wherein
the broadcast signal is compliant with an IP (Internet Protocol) transport scheme, and
data of the content resource file is placed into an IP packet that includes a UDP (User Datagram Protocol) packet and transported.

19. The transmission apparatus of claim 12, wherein
the content includes the advertisement content, and
the resource sharing information is the identification information for identifying the group to which the plurality of services sharing the resource of the advertisement content belongs.

20. A data processing method of a transmission apparatus, the data processing method comprising:
generating, by processing circuitry, control information that includes resource sharing information indicating whether a resource of content is shared among a plurality of services, the control information indicating a shared identifier that is associated with the resource when the shared resource is stored at a reception apparatus; and
sending the control information and the content, wherein
the shared identifier is associated with the plurality of services among which the resource is shared, and
at least one of the content includes advertisement content or the resource of the content includes at least one file of a broadcaster application, the resource sharing information being identification information for identifying a group to which the plurality of services sharing the resource of the advertisement content belongs in a case that the content includes the advertisement content.

* * * * *